United States Patent
Yamada et al.

(10) Patent No.: US 9,281,774 B2
(45) Date of Patent: Mar. 8, 2016

(54) MOTOR CONTROL SYSTEM

(75) Inventors: Kenji Yamada, Komaki (JP); Yasuhiro Nakai, Kariya (JP)

(73) Assignees: TOYOTA JIDOSHA KABUSHIKI KAISHA, Toyota-Shi (JP); DENSO CORPORATION, Kariya-Shi (JP)

( * ) Notice: Subject to any disclaimer, the term of this patent is extended or adjusted under 35 U.S.C. 154(b) by 82 days.

(21) Appl. No.: 14/343,910

(22) PCT Filed: Sep. 5, 2012

(86) PCT No.: PCT/IB2012/001710
§ 371 (c)(1),
(2), (4) Date: Mar. 10, 2014

(87) PCT Pub. No.: WO2013/038244
PCT Pub. Date: Mar. 21, 2013

(65) Prior Publication Data
US 2014/0217941 A1      Aug. 7, 2014

(30) Foreign Application Priority Data
Sep. 13, 2011   (JP) .................................. 2011-199467

(51) Int. Cl.
| | |
|---|---|
| H02P 1/46 | (2006.01) |
| H02P 27/08 | (2006.01) |
| B60L 15/02 | (2006.01) |
| H02P 27/06 | (2006.01) |
| H02P 21/00 | (2006.01) |

(52) U.S. Cl.
CPC ................. *H02P 27/08* (2013.01); *B60L 15/02* (2013.01); *H02P 21/0089* (2013.01); *H02P 27/06* (2013.01); *H02P 2201/07* (2013.01); *H02P 2201/09* (2013.01); *Y02T 10/643* (2013.01); *Y02T 10/644* (2013.01)

(58) Field of Classification Search
CPC .............. H02P 21/0035; H02P 21/005; H02P 21/0096; H02P 27/04; H02P 27/06; H02P 2201/07; H02P 2201/09; H02P 2201/11
See application file for complete search history.

(56) References Cited

U.S. PATENT DOCUMENTS

| | | | |
|---|---|---|---|
| 2007/0278986 A1* | 12/2007 | Okamura | ...................... 318/798 |
| 2010/0072925 A1* | 3/2010 | Itoh et al. | ................. 318/400.02 |
| 2010/0270955 A1* | 10/2010 | Yamakawa et al. | ........... 318/139 |
| 2010/0301788 A1* | 12/2010 | Chen et al. | ................. 318/400.3 |

FOREIGN PATENT DOCUMENTS

| | | |
|---|---|---|
| JP | 2006-311768 A | 11/2006 |
| JP | 2010114987 A | 5/2010 |

(Continued)

*Primary Examiner* — Eduardo Colon Santana
*Assistant Examiner* — Bickey Dhakal
(74) *Attorney, Agent, or Firm* — Kenyon & Kenyon LLP

(57) ABSTRACT

A motor control system includes: a power supply; a converter; an inverter; an alternating-current motor; and a control unit that drives the motor in any one of sinusoidal PWM control, overmodulation control and rectangular wave control through operation control of the converter and the inverter. The control unit starts step-up operation of the converter when a current vector of motor current of the motor on a d-q coordinate plane becomes a current phase corresponding to motor torque, at which a system loss is equal between before and after starting the step-up operation, while the control unit supplies the direct-current voltage, supplied from the power supply, to the inverter without stepping up the direct-current voltage by the converter and performs the rectangular wave control of the motor in a state where the current phase is an optimal current phase.

9 Claims, 14 Drawing Sheets

(56) References Cited

FOREIGN PATENT DOCUMENTS

| JP | 2010-172156 A | 8/2010 |
| JP | 2010-252488 A | 11/2010 |
| JP | 2010-268627 A | 11/2010 |
| JP | 2010268669 A | 11/2010 |
| JP | 2010279176 A | 12/2010 |

* cited by examiner

FIG. 9
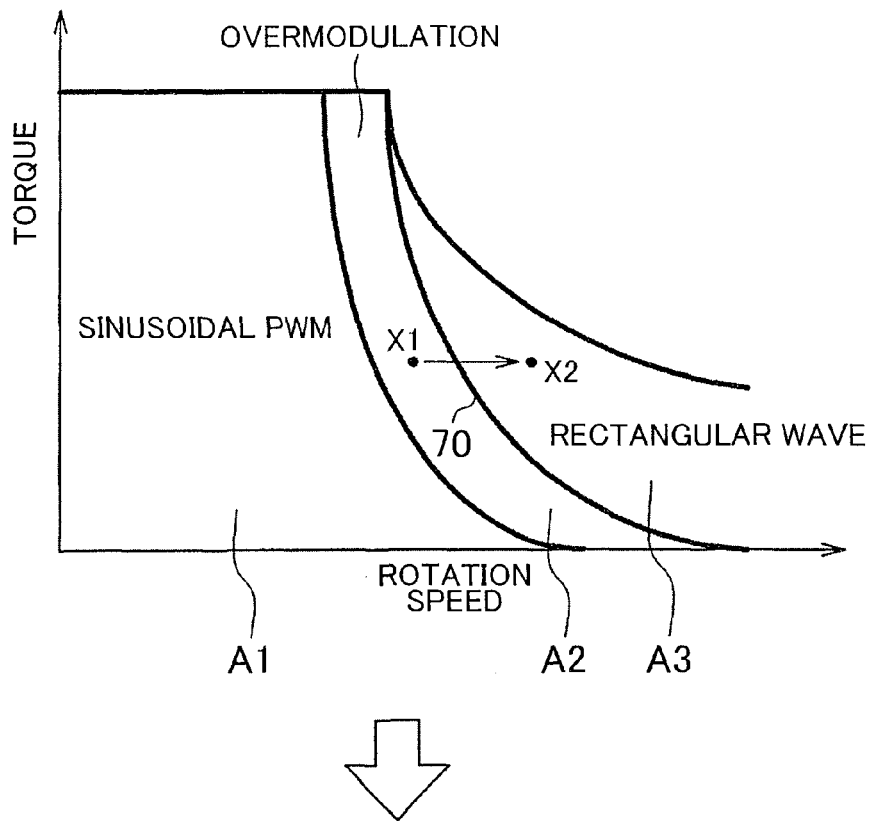
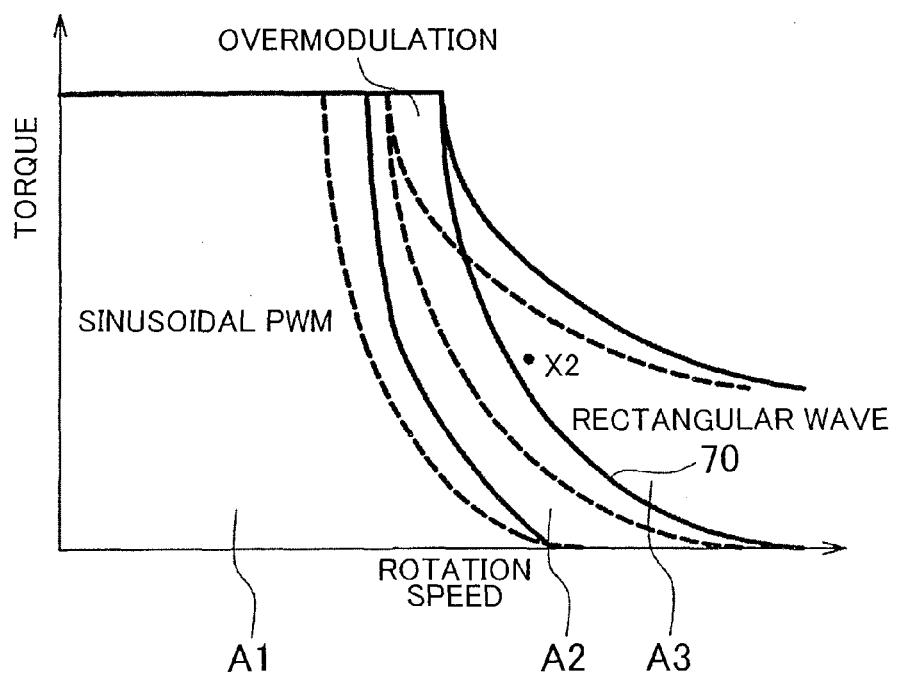

q-AXIS CURRENT THRESHOLD MAP

VOLTAGE PHASE THRESHOLD MAP

MOTOR CONTROL SYSTEM

CROSS REFERENCE TO RELATED APPLICATION

This is a national phase application based on the PCT International Patent Application No. PCT/IB2012/001710 filed on Sep. 5, 2012, claiming priority to Japanese application No. 2011-199467 filed Sep. 13, 2011, the entire contents of both of which are incorporated herein by reference.

BACKGROUND OF THE INVENTION

1. Field of the Invention

The invention relates to a motor control system and, more particularly, to a motor control system that executes drive control of an alternating-current motor by applying alternating-current voltage converted by an inverter from direct-current voltage stepped up by a converter.

2. Description of Related Art

In a related art, there is known an electric vehicle that includes an electric motor as a driving power source. The electric motor is driven by electric power from a battery to output power. A three-phase synchronous alternating-current motor may be used as the electric motor. The three-phase synchronous alternating-current motor is driven by the application of three-phase alternating-current voltage converted by an inverter from direct-current voltage supplied from a power supply.

In addition, in some electric vehicles as described above, the direct-current voltage supplied from the battery is not directly supplied to the inverter but is stepped up by a buck-boost converter according to a predetermined command value and then input to the inverter. it is advantageous to step up a system voltage with the use of the buck-boost converter to increase the system voltage in this way because it is possible to drive the alternating-current motor at higher torque and higher rotation speed.

Sinusoidal pulse width modulation (PWM) control, overmodulation control and rectangular wave control are known as a control method for the three-phase alternating-current motor. These control methods are selectively switched and used on the basis of a driving condition of a vehicle, a modulation factor (described later), and the like, widely.

For example, Japanese Patent Application Publication No. 2006-311768 (JP 2006-311768 A) describes a motor drive system controller that, in a predetermined control mode in which a modulation factor is not fixed, sets a target modulation factor such that a loss in the system is reduced as a whole and that variably controls a system voltage that is a voltage stepped up by a converter so that the modulation factor becomes the target modulation factor.

In addition, Japanese Patent Application Publication No. 2010-172156 (JP 2010-172156 A) describes that, in a motor control system for a vehicle, when a voltage phase reaches a threshold while rectangular wave control is being executed with the use of a battery voltage, the step-up operation of a converter is started.

As in the case of the motor control system described in JP 2006-311768 A, in a motor control system that includes a converter, an inverter and an alternating-current motor, it is advantageous to decrease a voltage stepped up by the converter to operate the alternating-current motor in rectangular wave control, that is, so-called single-pulse control, in order to reduce a switching loss in the converter and the inverter. However, because rectangular wave control is voltage phase control under field-weakening control, a motor loss increases as a field-weakening current increases. On the other hand, when a voltage stepped up by the converter is increased to operate the alternating-current motor in sinusoidal PWM control, a motor loss is reduced. However, due to a switching loss resulting from an increase in the number of switching operations, a loss in the converter and the inverter increases. Thus, a loss of the whole system that includes the alternating-current motor is minimized when the current vector of motor current is on an optimal current advance line at which maximum torque is output or near the optimal current advance line during rectangular wave control.

When the operation of the alternating-current motor is controlled in a rectangular wave control mode in which the current phase of motor current is on the optimal current advance line or near the optimal current advance line in this way (such a current phase is hereinafter referred to as the optimal current phase), a modulation factor in rectangular wave control is constant (for example, 0.78) and therefore, it is not possible to variably control the system voltage while setting a modulation factor as a target as described in JP 2006-311768 A.

In addition, in a motor control system that includes a step-up converter, rectangular wave control with the above-described optimal current phase is executed by directly using a battery voltage as a system voltage without stepping up the battery voltage, the step-up operation of the converter needs to be started at a certain point in time as output torque required for a motor increases. However, because the modulation factor is constant as described above, it is not possible to determine whether to start the step-up operation on the basis of the modulation factor.

In this case, it is conceivable that the step-up operation of the converter is started immediately after shifting into rectangular wave control. In this case, the system voltage after starting step-up operation needs to be increased by at least a minimum step-up voltage having a predetermined value due to restrictions on the configuration of the converter, so an operation point at which rectangular wave control with the optimal current phase is executed by using the battery voltage shifts into an operation point in overmodulation control mode or sinusoidal PWM control mode in which a system loss is relatively large due to the above-described increase in the system voltage by the minimum step-up voltage. As a result, until a torque command to the motor increases and rectangular wave control is executed again after the start of step-up operation of the converter, the system is operated in a state where a system loss is large.

SUMMARY OF THE INVENTION

The invention provides a motor control system that is able to suppress an increase in system loss by starting the step-up operation of a converter at an appropriate timing while rectangular wave control is performed.

A motor controller according to a first aspect of the invention includes: a converter that is configured to be able to step up a direct-current voltage, supplied from a power supply, in accordance with a system voltage command value; an inverter that is configured to convert a direct-current voltage, which is a system voltage output from the converter, to an alternating-current voltage; a motor that is driven by the alternating-current voltage applied from, the inverter; and a control unit that is configured to drive the motor in any one of control methods of sinusoidal PWM control, overmodulation control and rectangular wave control by executing operation control of the converter and the inverter, wherein the control unit is configured to start step-up operation of the converter when a current vector of motor current of the motor on a d-q coordinate plane becomes a current phase corresponding to motor torque, at which a system loss is equal between before and after starting the step-up operation, while the control unit supplies the direct-current voltage, supplied from the power supply, to the inverter without stepping up the direct-current voltage by the converter and performs the rectangular wave control of the motor in a state where the current phase is an optimal current phase.

In the motor control system according to the first aspect, the control unit may be configured to start the step-up operation of the converter when the current vector of the motor current becomes a current phase corresponding to motor torque, at which a system loss is equal between before and after starting the step-up operation, provided that the direct-current voltage of the power supply is stepped up by a predetermined voltage value when the step-up operation of the converter is started.

In the motor control system according to the first aspect, the control unit may store a step-up start threshold line on a larger phase side of an optimal current advance line on the d-q coordinate plane in the form of a map, and may be configured to start the step-up operation of the converter when the current phase of the current vector goes beyond the step-up start threshold line to the larger phase side.

In the motor control system according to the first aspect, the control unit may be configured to start the step-up operation of the converter when a q-axis current that determines, the current vector is smaller than a q-axis current threshold on the step-up start threshold line.

In the motor control system according to the first aspect, the control unit may be configured to stop the step-up operation of the converter and supply the direct-current voltage of the power supply directly to the inverter when the system voltage command value becomes lower than a first step-up stop threshold and the system voltage detected by a sensor becomes lower than a second step-up stop threshold while the step-up operation of the converter is performed.

A motor control system according to a second aspect of the invention includes: a converter that is configured to be able to step up a direct-current voltage, supplied from a power supply, in accordance with a system voltage command value; an inverter that is configured to convert a direct-current voltage, which is a system voltage output from the converter, to an alternating-current voltage; a motor that is driven by the alternating-current voltage applied from the inverter; and a control unit that is configured to drive the motor in any one of control methods of sinusoidal PWM control, overmodulation control and rectangular wave control by executing operation control of the converter and the inverter, wherein the control unit is configured to start step-up operation of the converter when a voltage phase of a rectangular-wave voltage applied to the motor becomes a voltage phase corresponding to motor torque, at which a system loss is equal between before and after starting the step-up operation, while the control unit supplies the direct-current voltage, supplied from the power supply, to the inverter without stepping up the direct-current voltage by the converter and performs the rectangular wave control of the motor in a state where a current phase of a current vector of motor current of the motor on a d-q coordinate plane is an optimal current phase.

In the motor control system according to the second aspect, the control unit may be configured to start the step-up operation of the converter when the voltage phase of the rectangular-wave voltage becomes a voltage phase corresponding to motor torque, at which a system loss is equal between before and after starting the step-up operation, provided that the direct-current voltage of the power supply is stepped up by a predetermined voltage value when the step-up operation of the converter is started.

In the motor control system according to the second aspect, the control unit may store a map that defines a correlation between the system voltage and a voltage phase threshold, and may be configured to start the step-up operation of the converter when the voltage phase of the rectangular-wave voltage exceeds a step-up start threshold derived from the map.

In the motor control system according to the second aspect, the control unit may be configured to stop the step-up operation of the converter and supply the direct-current voltage of the power supply directly to the inverter when the system voltage command value becomes lower than a first step-up stop threshold and the system voltage detected by a sensor becomes lower than a second step-up stop threshold while the step-up operation of the converter is performed.

To suppress an increase in system loss between before and after starting step-up operation, it is required to start the step-up operation of the converter at an appropriate timing while rectangular wave control is performed in a state where a motor current is at the optimal current phase. It is possible to determine whether to start the step-up operation on the basis of the phase of a rectangular-wave voltage as, described in JP 2010-172156 A. However, it is desirable to control the start of step-up operation of the converter not only for suppressing torque fluctuations but also in consideration of a loss of the system as a whole.

With the motor control systems according to the invention, it is possible to suppress an increase in system loss by starting the step-up operation of a converter at an appropriate timing while rectangular wave control is performed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a graph that shows a state where a control method switching line is displaced through correction of a system voltage and that is similar to FIG. 3;

DETAILED DESCRIPTION OF EMBODIMENTS

Hereinafter, embodiments according to the invention (hereinafter, embodiments) will be described in detail with reference to the accompanying drawings. In the description, shapes, materials, numeric values, directions, and the like, are illustrative for the sake of easy understanding of the invention, and may be modified as needed in accordance with an application, a purpose, specifications, and the like. In addition, when a plurality of embodiments, alternative embodiments, and the like, are included in the following description, it is originally assumed to use characterizing portions of them in combination where appropriate.

Figure 1:
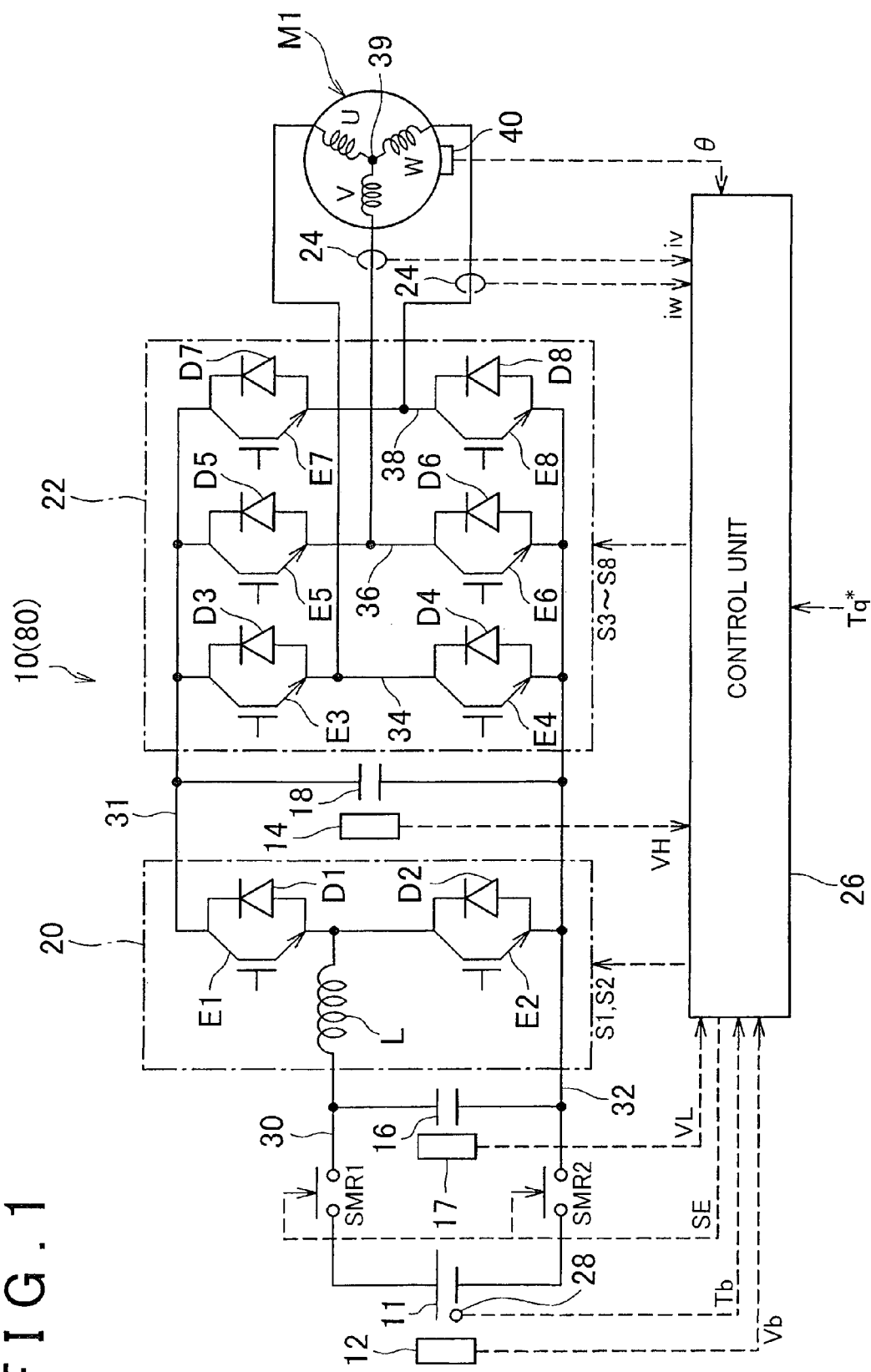
FIG. 1 is a diagram that schematically shows an overall configuration of a motor control system.

FIG. 1 is a diagram that shows an overall configuration of a motor control system 10 according to an embodiment. The motor control system 10 may be suitably used in an electric vehicle, such as a hybrid vehicle, a pure electric vehicle, or the like, on which an electric motor is mounted as a driving power source.

The motor control system 10 includes a battery 11, a converter 20, inverter 221, alternating-current motor M1 and a control unit 26. The battery 11 serves as a direct-current power supply. The converter 20 is connected to the battery 11. The inverter 221 is connected to the converter 20. The alternating-current motor M1 is respectively connected to inverter 221. The control unit 26 controls operations of the converter 20 and inverter 221.

The alternating-current motor M1 is a driving electric motor to generate torque for driving drive wheels of a vehicle. Alternatively, the alternating-current motor M1 may be configured to have the function of a generator that is driven by an engine or may be configured to have both the function of an electric motor and the function of a generator. Furthermore, the alternating-current motor M1 may be incorporated in a hybrid vehicle such that the alternating-current motor M1 operates as an electric motor to, for example, be able to start an engine.

The battery 11 includes a secondary battery, such as a nickel metal hydride battery and a lithium ion battery. Alternatively, other than the secondary battery, a capacitor with no chemical reaction or a fuel cell may be used as a power supply device. A voltage sensor 12 detects a direct-current voltage or battery voltage Vb output from the battery 11, and outputs the detected direct-current voltage Vb to the control unit 26. A temperature sensor 28 is provided on the battery 11. A battery temperature Tb detected by the temperature sensor 28 is output to the control unit 26.

A system main relay SMR1, is provided on a power line 30 that is connected to the positive electrode terminal of the battery 11. In addition, a system main relay SMR2 is provided on a ground line 32 that is connected to the negative electrode terminal of the battery 11. The system main relays SMR1 and SMR2 are turned on or off by a signal SE from the control unit 26. More specifically, the system main relays SMR1 and SMR2 are turned on by an H (logical high) level signal SE from the control unit 26, and are turned off by an L (logical low) level signal SE from the control unit 26.

A smoothing capacitor 16 is connected between the power line 30 and the ground line 32. The smoothing capacitor 16 has the function of smoothing the battery voltage Vb by charging and discharging and supplying the smoothed battery voltage Vb to the converter 20. The battery voltage Vb is direct-current voltage supplied from the battery 11. A voltage sensor 17 is provided for the smoothing capacitor 16. A converter input voltage VL detected by the voltage sensor 17 is output to the control unit 26.

The converter 20 includes a reactor L, power semiconductor switching elements E1 and E2 (hereinafter referred to as the switching element) and diodes D1 and D2. The switching elements E1 and E2 are connected in series with each other between the power line 31 and the ground line 32. On/off states of the switching elements E1 and E2 are respectively controlled by switching control signals S1 and S2 from the control unit 26.

An insulated gate bipolar transistor (IGBT), or the like, may be suitably used as each switching element. Antiparallel diodes D1 and D2 are respectively connected to the switching elements E1 and E2.

A smoothing capacitor 18 is provided between the converter 20 and the inverter 22. The smoothing capacitor 18 is connected between a power line 31 and the ground line 32. The smoothing capacitor 18 has the function of smoothing direct-current voltage from the converter 20 and supplying the smoothed direct-current voltage to the inverter 22. The voltage sensor 14 detects a voltage across the smoothing capacitor 18, that is, a system voltage VH, and outputs the detected value VH to the control unit 26.

The inverter 22 includes a U-phase arm 34, a V-phase arm 36 and a W-phase arm 38 that are provided in parallel with one another between the power line 31 and the ground line 32. Each of the phase arms 34 to 38 includes switching elements that are connected in series with each other between the positive electrode-side power line 31 and the ground line 32. For example, the U-phase arm 34 includes switching elements E3 and E4, the V-phase arm 36 includes switching elements E5 and E6 and the W-phase arm 38 includes switching elements E7 and E8. In addition, antiparallel diodes D3 to D8 are respectively connected to the switching elements E3 to E8. On/off states of the switching elements E3 to E8 are respectively controlled by switching control signals S3 to S8 from the control unit 26.

Midpoints of the phase arms 34 to 38 are respectively connected to corresponding phase coils of the alternating-current motor M1. That is, the alternating-current motor M1 is a three-phase synchronous permanent magnet motor. One ends of the three U, V and W-phase coils are connected in common to a neutral point 39, and the other end of each phase coil is connected to the midpoint of the switching elements of the corresponding one of the phase arms 34 to 38.

When the switching element E1 of the upper arm is kept in an on state and the switching element E2 of the lower arm is kept in an off state, the converter 20 directly supplies the battery voltage Vb to the inverter 22 as the system voltage VH without stepping up the battery voltage Vb. Hereinafter, such a state of the converter 20 is termed "upper arm on state".

During step-up operation, the converter 20 supplies, to the inverter 22, direct-current voltage stepped up from the direct-current voltage supplied from the battery 11. More specifically, in response to the switching control signals S1 and S2 from the control unit 26, an on period during which the switching element E1 is turned on and an on period during which the switching element E2 is turned on are alternately provided, and a step-up ratio depends on the ratio of these on periods.

The converter 20 is able to step up the direct-current voltage of, for example, approximately 300 V, supplied from the battery 11, to a step-up upper limit voltage of, for example, approximately 650 V. However, the step-up upper limit voltage is not a fixed value but may be, for example, variable in accordance with a request from the vehicle, or the like. For example, a configuration may be employed, in which, when an economy mode is selected through driver's switch operation, an ECO signal is input to the control unit 26 and then the step-up upper limit value of the converter 20 is limited to, for example, approximately 400 V.

In addition, during step-down operation, the converter 20 steps down the direct-current voltage, supplied from the inverter 22 via the smoothing capacitor 18, and charges the battery 11. More specifically, in response to the switching control signals S1 and S2 from the control unit 26, an on period during which only the switching element E1 is turned on and a period during which both the switching elements E1 and E2 are turned off are alternately provided, and a step-down ratio depends on the duty ratio of the on period.

When a torque command value Tq* of the alternating-current motor M1 is positive (Tq*>0), the inverter 22 converts the system voltage VH, which is a direct-current voltage input from the converter 20, to alternating-current voltage through switching operations of the switching elements E3 to E8 according to the switching control signals S3 to S8 from the control unit 26 to drive the alternating-current motor M1 so that a positive torque is output. In addition, when the torque command value Tq* of the alternating-current motor M1 is zero (Tq*=0), the inverter 22 converts the system voltage VH to alternating-current voltage through switching operations according to the switching control signals S3 to S8 to drive the alternating-current motor M1 so that torque becomes zero. In this way, the alternating-current motor M1 is driven so as to generate a positive or zero torque specified by the torque command value Tq*.

In addition, during regenerative braking of the vehicle on which the motor control system 10 is mounted, the torque command value Tq* of the alternating-current motor M1 is set to a negative value (Tq*<0). In this case, the inverter 22 converts alternating-current voltage, generated by the alternating-current motor M1, to direct-current voltage through switching operations according to the switching control signals S3 to S8, and supplies the converted direct-current voltage to the converter 20 via the smoothing capacitor 18. Note that the regenerative braking includes braking with regenerative power generation in the case where a driver who drives a hybrid vehicle or an electric vehicle depresses a foot brake and releasing an accelerator pedal during travelling to decelerate (or stop accelerating) the vehicle while performing regenerative power generation although the foot brake is not operated.

A current sensor 24 detects a motor current flowing through the alternating-current motor M1, and outputs the detected motor current to the control unit 26. Note that because the sum of instantaneous values of three-phase currents iu, iv and iw is zero, as shown in FIG. 1, it suffices that the current sensor 24 is arranged so as to detect two-phase motor currents (for example, V-phase current iv and W-phase current iw).

A rotation angle sensor 40, such as a resolver, is provided for the alternating-current motor M1. The rotation angle sensor 40 detects a rotor rotation angle θ of the alternating-current motor M1, and transmits the detected rotation angle θ to the control unit 26. The control unit 26 calculates the rotation speed N and rotation velocity w of the alternating-current motor M1 on the basis of the rotor rotation angle θ.

The control unit 26 generates the switching control signals S1 to S8 to control the operations of the converter 20 and inverter 22 so that the alternating-current motor M1 outputs a torque according to the torque command value Tq* by a method (described later) on the basis of the torque command value Tq* input from an externally provided electronic control unit (ECU), the battery voltage Vb detected by the voltage sensor 12, the system voltage VH detected by the voltage sensor 14, the motor currents iv and iw from the current sensor 24, and the rotation angle θ from the rotation angle sensor 40.

Note that, in the above description, the torque command value Tq* is input from the external ECU to the control unit 26; however, the configuration is not limited to this. For example, the control unit 26 may generate the torque command value Tq* on the basis of an input accelerator operation amount, vehicle speed, and the like, of the vehicle.

During step-up operation of the converter 20, the control unit 26 executes feedback control of the output voltage VH of the smoothing capacitor 18, and generates the switching control signals S1 and S2 such that the output voltage VH of the converter 20 becomes a system voltage command value VH*.

In addition, when the control unit 26 receives a signal, indicating that the vehicle enters a regenerative braking mode, from the external ECU, the control unit 26 generates the switching control signals S3 to S8 such that alternating-current voltage generated by the alternating-current motor M1 is converted to direct-current voltage, and outputs the switching control signals S3 to S8 to the inverter 22. In this way, the inverter 22 converts alternating-current voltage, generated by the alternating-current motor M1, to direct-current voltage, and supplies the direct-current voltage to the converter 20.

Furthermore, when the control unit 26 receives a signal, indicating that the vehicle enters the regenerative braking mode, from the external ECU, the control unit 26 generates the switching control signals S1 and S2 such that the direct-current voltage supplied from the inverter 22 is stepped down, and outputs the switching control signals S1 and S2 to the converter 20. In this way, the alternating-current voltage generated by the alternating-current motor M1 is converted to stepped-down direct-current voltage, and the battery 11 is charged with the stepped-down direct-current voltage.

Figure 2:
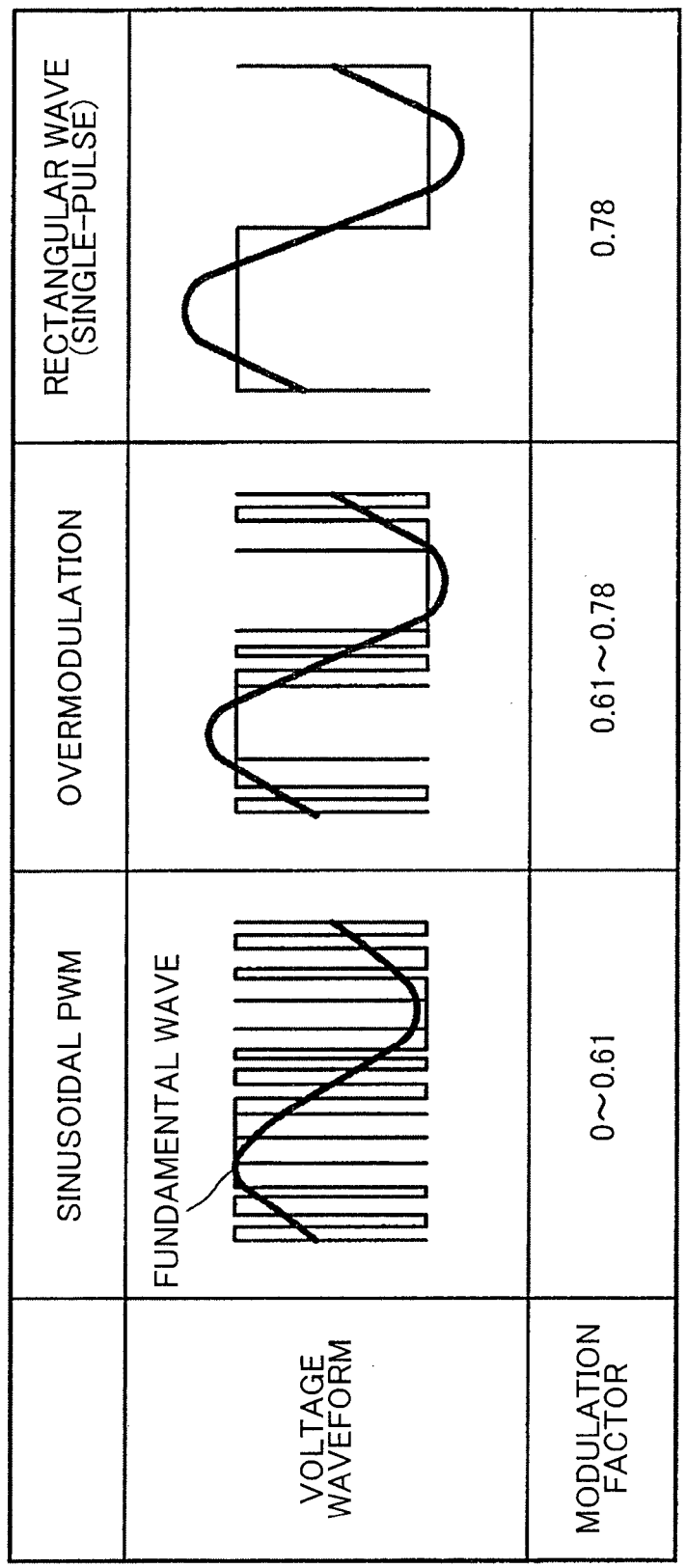
FIG. 2 is a diagram that shows a voltage waveform and a modulation factor in sinusoidal PWM control, overmodulation control and rectangular wave control.

Next, power conversion in the inverter 22, controlled by the control unit 26, will be described in detail. In the motor control system 10 according to the present embodiment, three control methods (control modes) shown in FIG. 2 are switched and used in power conversion in the inverter 22.

A sinusoidal PWM control method is generally used as PWM control, and on/off states of the switching elements in each phase arm are controlled in accordance with a comparison in voltage between a sinusoidal voltage command value and a carrier wave (typically, triangular wave). As a result, a duty ratio is controlled so that a fundamental wave component of a set of a high-level period corresponding to an on period of the upper arm element and a low-level period corresponding to an on period of the lower arm element becomes a sinusoidal alternating-current voltage (required motor voltage) within one control period. As is known, in a general sinusoidal PWM control method, it is possible to increase a modulation factor Kmd to 0.61. The modulation factor Kmd is defined as the ratio of the amplitude of a required motor voltage to a system voltage VH. However, in the case of sinusoidal PWM control in a two-phase modulation method or third-order harmonic superimposition control, it is known that the modulation factor Kmd is increased to 0.70.

On the other hand, in a rectangular wave control method, one rectangular-wave pulse, of which the ratio of the high-level period and the low-level period is 1 to 1, is applied to the alternating-current motor M1 within the one control period. In the rectangular wave control method, the amplitude of a fundamental wave component is fixed, so that torque control is executed through voltage phase control of a rectangular-wave pulse based on a deviation between a torque command value and an actual torque value obtained by referring to a map or computing electric power. In this way, the modulation factor Kmd is increased to 0.78.

An overmodulation control method, as well as the above-described sinusoidal PWM control method, is to execute PWM control in accordance with a comparison in voltage between a sinusoidal voltage command value and a carrier wave. However, in this case, a rectangular pulse having a relatively large duty ratio is generated in a range in which the voltage command value is larger than the carrier wave and, as a result, it is possible to expand the amplitude of a substantially sinusoidal fundamental wave component. Thus, it is possible to increase the modulation factor Kmd within the range of 0.61 to 0.78.

Figure 3:
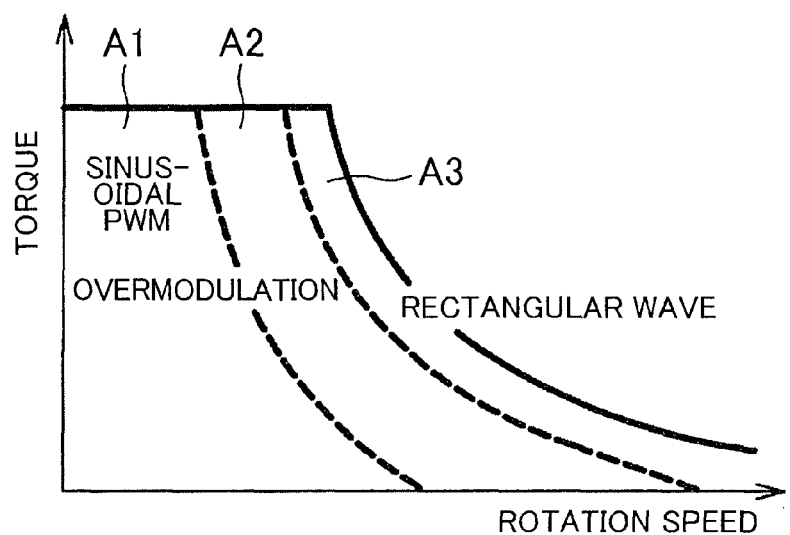
FIG. 3 is a diagram that shows a map that defines an operating condition of the motor by torque and rotation speed.

In the motor control system 10 according to the present embodiment, it is possible to drive the alternating-current motor M1 in any one of the above-described three control methods by supplying the battery voltage Vb to the inverter 22 as the system voltage VH without causing the converter 20 to perform step-up operation or stepping up the battery voltage Vb and supplying the stepped-up voltage to the inverter 22. FIG. 3 is a map that shows an application example of the above-described three control methods. In the map, the abscissa axis represents motor rotation speed, and the ordinate axis represents motor output torque. As shown in FIG. 3, sinusoidal PWM control is applied from a low rotation speed range to an intermediate rotation speed range, overmodulation control is applied from the intermediate rotation speed range to a high rotation speed range, and rectangular wave control is applied in a higher rotation speed range.

The control unit 26 selects the control method from among the three control methods in the following manner. Upon receiving the torque command value Tq* of the alternating-current motor M1 that is calculated by and input from the external ECU (not shown) from a required vehicle output based on an accelerator operation amount, or the like, the control unit 26 calculates the required motor voltage from the torque command value Tq* and motor rotation speed N of the alternating-current motor M1 on the basis of a preset map as shown in FIG. 3, or the like.

Then, the control unit 26 selects any one of field-weakening control (rectangular wave control method) and maximum torque control (sinusoidal PWM control method or overmodulation control method) for executing motor control in accordance with the correlation between a required motor voltage and a battery voltage Vb. During application of maximum torque control, one of the sinusoidal PWM control method and the overmodulation control method is selected depending on a modulation factor range of the voltage command value according to vector control. That is, sinusoidal PWM control is selected when 0<modulation factor≤0.61, and overmodulation control is selected when 0.61<modulation factor<0.78. In addition, rectangular wave control is selected when modulation factor≤0.78.

As described above, the modulation factor Kmd is constant at 0.78 in rectangular wave control, so that an output torque and a rotation speed that are obtained through rectangular wave control executed using the battery voltage Vb as the system voltage VH directly are limited. Therefore, when an output torque corresponding to a torque command value Tq* cannot be generated from the battery voltage Vb, for example, the converter 20 is caused to start step-up operation to increase the system voltage VH. However, the converter 20 has a step-up upper limit value (or step-up maximum value) depending on the withstand voltage performance of each of the switching elements, and the like, that constitute the converter 20 and the inverter 22. Thus, when the system voltage VH reaches the step-up upper limit value, the rectangular wave control method in accordance with field-weakening control is applied while maintaining the state where the system voltage VH is the step-up upper limit value.

Figure 4:
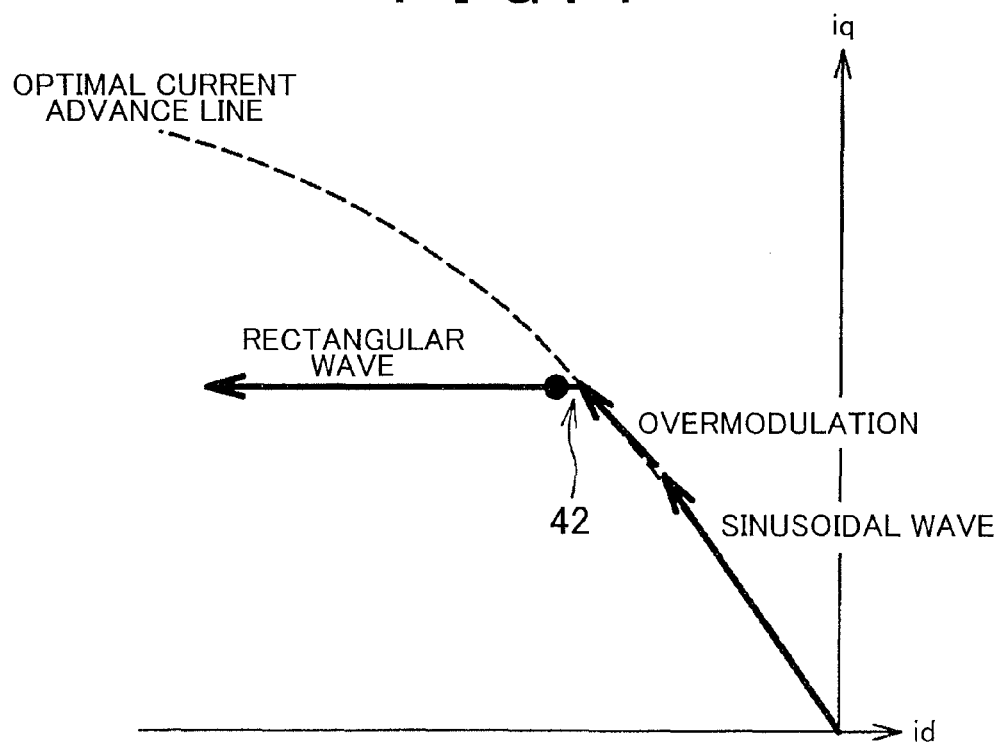
FIG. 4 is a graph that shows a current phase of motor, current in sinusoidal PWM control, overmodulation control and rectangular wave control on a d-q coordinate plane.

FIG. 4 is a graph that shows a current phase of motor current in sinusoidal PWM control, overmodulation control, and rectangular wave control on a d-q coordinate plane. In the graph, the abscissa axis represents d-axis current id, and the ordinate axis represents q-axis current iq. Then, an optimal current advance line is indicated by broken line. The optimal current advance line is drawn by connecting points of optimal current phases (id, iq)opt at which a loss in the alternating-current motor M1 is minimum. The optimal current advance line may be obtained by an experiment, simulation, or the like, in advance, and stored. Note that, to be precise, the "current phase" is expressed as an angle formed by a current vector, the starting point of which is the intersection of the d axis (abscissa axis) and the q axis (ordinate axis), and the end point of which is the coordinate point (id, iq), with respect to the d axis or q axis; however, in the specification, for the sake of easy description, it is assumed that the end point of the current vector corresponds to a current phase.

As shown in FIG. 4, when the alternating-current motor M1 is driven in sinusoidal PWM control or overmodulation control, motor current is controlled by the inverter 22 so that the current phase of the current vector of the motor current coincides with a current phase on the optimal current advance line. In contrast to this, in rectangular wave control, the absolute value of d-axis current id that is field current increases in order to execute field-weakening control, so that the end point, that is, the current phase, of the current vector separates from the optimal current advance line leftward (or toward a larger phase side) in the graph, and a motor loss increases. This state will be described with reference to FIG. 5(a) to FIG. 5(c).

Figure 5:
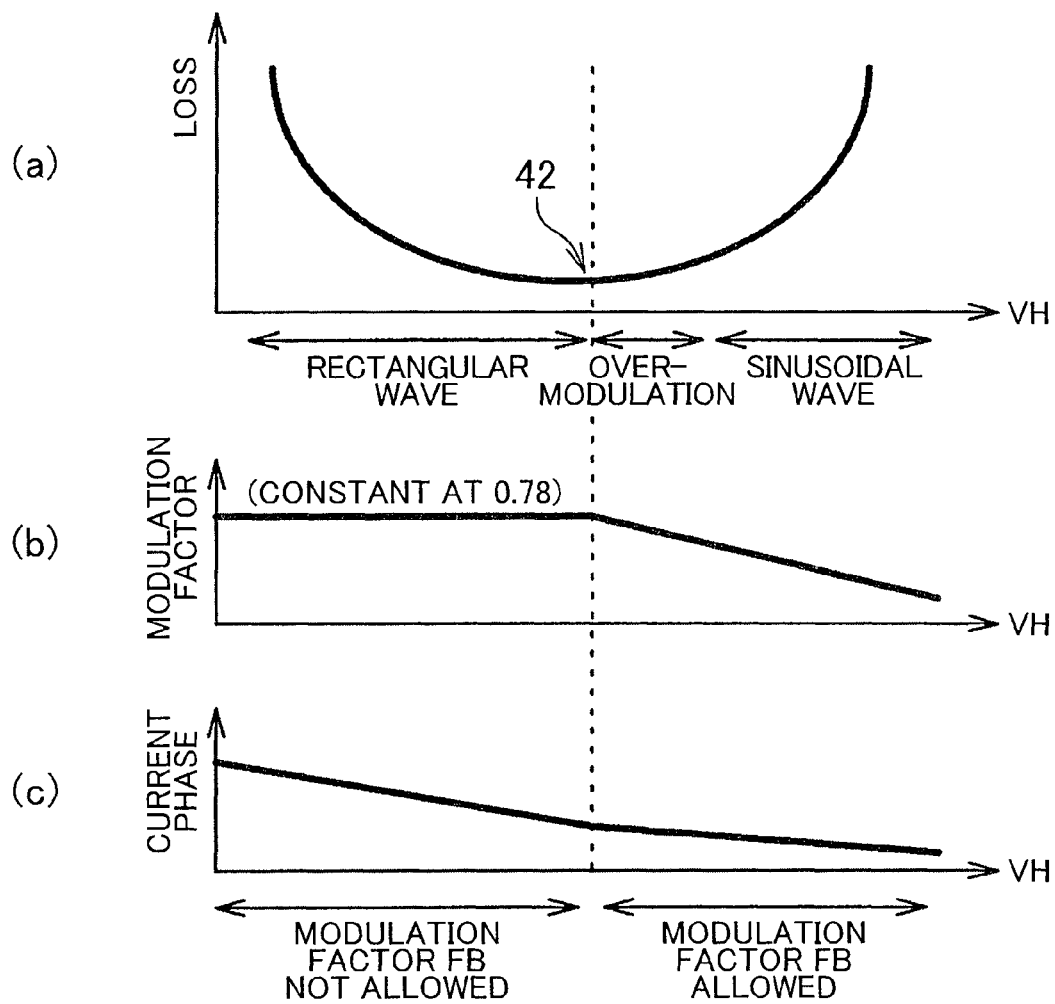
FIG. 5 shows graphs, in which (a) shows a correlation between a system voltage and a system loss in three control modes, (b) shows a correlation between a system voltage and a modulation factor in the three control modes, and (c) shows a correlation between a system voltage and a motor current phase in the three control modes.

FIG. 5(a) is a graph that shows the correlation between a system voltage VH and a system loss in the three control modes. FIG. 5(b) is a graph that shows the correlation between a system voltage VH and a modulation factor. Kmd in the three control modes. FIG. 5(c) is a graph that shows the correlation between a system voltage VH and a motor current phase in the three control modes.

Referring to FIG. 5(a), it is advantageous to operate the alternating-current motor M1 in rectangular wave control of so-called single-pulse control while decreasing a voltage stepped up by the converter 20, in order to reduce a switching loss in the converter 20 and the inverter 22 and to minimize a loss of the whole system. However, since rectangular wave control is voltage phase control under field-weakening control as described above, a motor loss increases with an increase in field-weakening current and, accordingly, a loss of the whole system also increases.

On the other hand, when the alternating-current motor M1 is operated in sinusoidal PWM control while increasing a voltage stepped up by the converter 20, a motor loss is reduced. However, due to a switching loss resulting from an increase in the number of switching operations, a loss in the converter and the inverter increases. Thus, a loss of the whole system that includes the alternating-current motor M1 is minimized when the current vector of motor current is on an optimal current advance line, at which maximum torque is output, or near the optimal current advance line, that is, the current phase is an optimal current phase (id, iq)opt, during rectangular wave control. Hereinafter, such a current phase on the optimal current advance line or near the optimal current advance line is termed an optimal current phase (id, iq)opt. In FIG. 4 and FIG. 5(a), an operation point of the alternating-current motor M1 in rectangular wave control at the optimal current phase (id, iq)opt is indicated by the reference numeral 42.

When the operation of the alternating-current motor M1 is controlled through rectangular wave control while the motor current is the optimal current phase (id, iq)opt in this way, as shown in FIG. 5(b) and FIG. 5(c), the modulation factor Kmd in rectangular wave control is constant (0.78), so that it is impossible to optimally execute variable control of the system voltage VH by executing control by feedback of the modulation factor Kmd.

Thus, in the motor control system 10 according to the present embodiment, the control unit 26 corrects the system voltage command value VH* by executing control by feedback of the current phase (id, iq) of motor current flowing through the alternating-current motor M1. In this way, rectangular wave control with the optimal current phase (id, iq)opt is actively utilized. Next, correction control of the system voltage command value through control by feedback of the current phase in the control unit 26 will be described with reference to FIG. 6.

Figure 6:
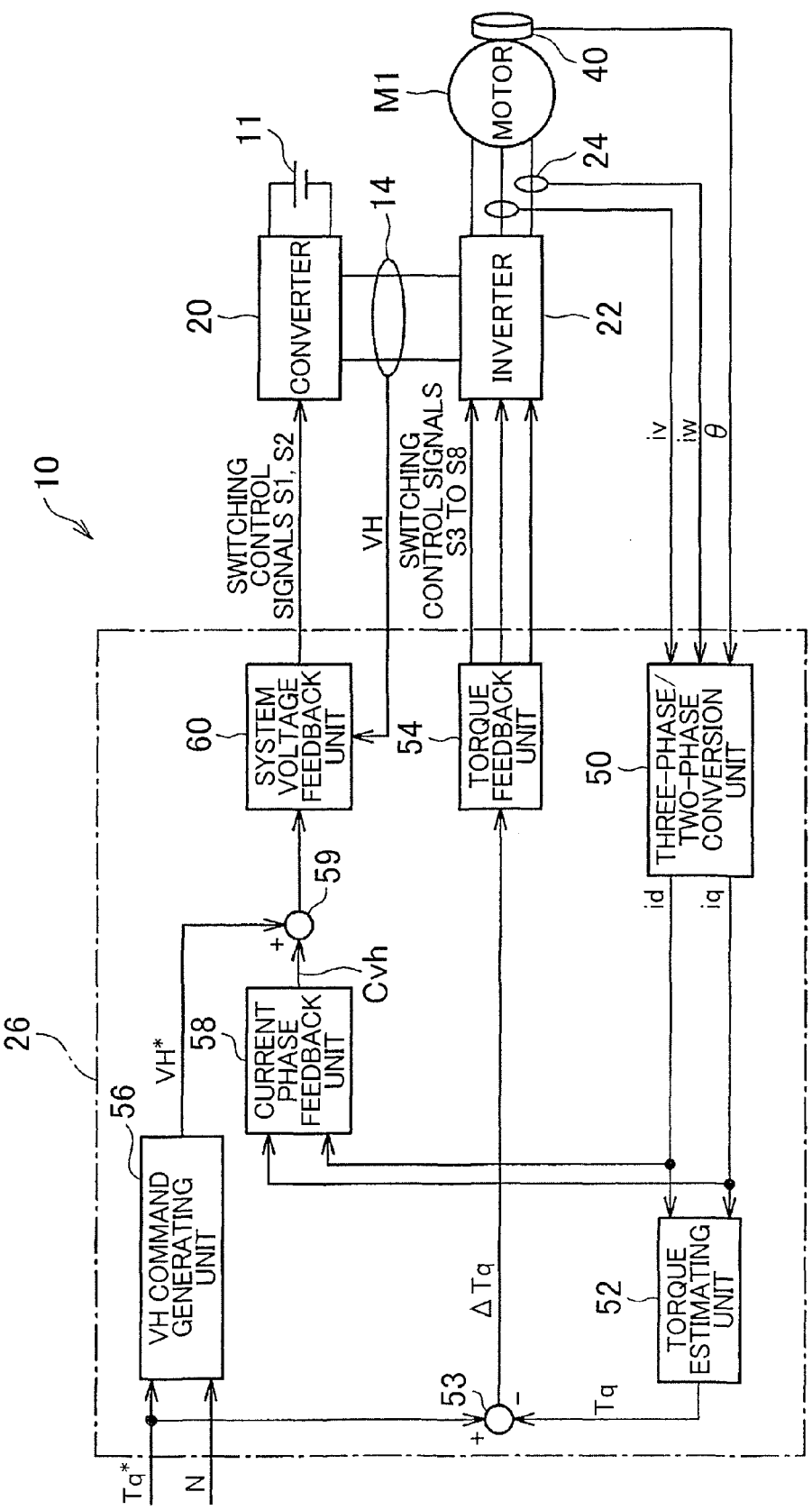
FIG. 6 is a block diagram that shows a control unit.

FIG. 6 is a block diagram that shows a control configuration related to rectangular wave control and current phase feedback control in the control unit 26. The control configuration shown in FIG. 6 is implemented through control processing in accordance with a predetermined program executed by the control unit 26. Instead, part or whole of the control configuration may be implemented by a hardware element.

The control unit 26 includes a three-phase/two-phase conversion unit 50, a torque estimating unit 52, a subtracting unit 53, a torque feedback unit 54, a system voltage command generating unit 56, a current phase feedback unit 58, and a system voltage feedback unit 60.

The three-phase/two-phase conversion unit 50 has the function of converting three-phase motor currents iu, iv and iw, flowing through the alternating-current motor M1, to two-phase d-axis and q-axis currents id and iq by coordinate conversion with the use of the rotor rotation angle θ and outputting the two-phase currents id and iq. Specifically, the U-phase current iu (=−(iv+iw)) is calculated from the V-phase current iv and the W-phase current iw that are detected by the current sensor 24, the d-axis current id and the q-axis current iq are generated on the basis of these iu, iv and iw by referring to the rotation angle θ detected by the rotation angle sensor 40, and the generated d-axis current id and q-axis current iq are output.

The torque estimating unit 52 has the correlation between a torque and a current, measured in advance, as a map, and refers to the map to derive, an actual torque Tq on the basis of the d-axis current id and the q-axis current iq input from the three-phase/two-phase conversion unit 50.

The subtracting unit 53 compares the torque command Tq* input from the external ECU with the actual torque Tq derived as described above to generate a torque deviation ΔTq, and inputs the torque deviation ΔTq to the torque feedback unit 54.

The torque feedback unit 54 performs PI operation of the torque deviation ΔTq with the use of a predetermined proportional gain and a predetermined integral gain to obtain a control deviation, and sets a phase Φv of rectangular-wave voltage on the basis of the obtained control deviation. Specifically, in the case where a positive torque is generated (Tq>0), the voltage phase is advanced when the torque is insufficient, while the voltage phase is retarded when the torque is excessive; whereas, in the case where a negative torque is generated (Tq<0), the voltage phase is retarded when the torque is insufficient, while the voltage phase is advanced when the torque is excessive. Note that, in the present embodiment, proportional and integral control is executed in order to eliminate the torque deviation ΔTq; however, it is not limited to this configuration. Instead, proportional, integral and derivative control (PID control) may be executed.

Furthermore, the torque feedback unit 54 obtains two-phase voltage command values Vd* and Vq in accordance with the voltage phase Φv, converts these two-phase voltage command values Vd* and Vq* to three-phase voltage command values (rectangular-wave pulses) Vu*, Vv* and Vw* through coordinate conversion (two phase to three phase) with the use of the rotation angle θ, and then generates the switching control signals S3 to S8 in accordance with these three-phase voltage command values Vu*, Vv* and Vw*. As a result, the inverter 22 performs switching operation in accordance with the switching control signals S2 to S8. In this way, the alternating-current voltages according to the voltage phase Φv are applied as the phase voltages Vu, Vv and Vw of the motor M1.

The system voltage command generating unit 56 refers to a preset table, map, or the like, to generate and output the generated system voltage command value VH* on the basis of the torque command value Tq* input from the external ECU and the motor rotation speed N calculated from the rotation angle θ.

Figure 7:
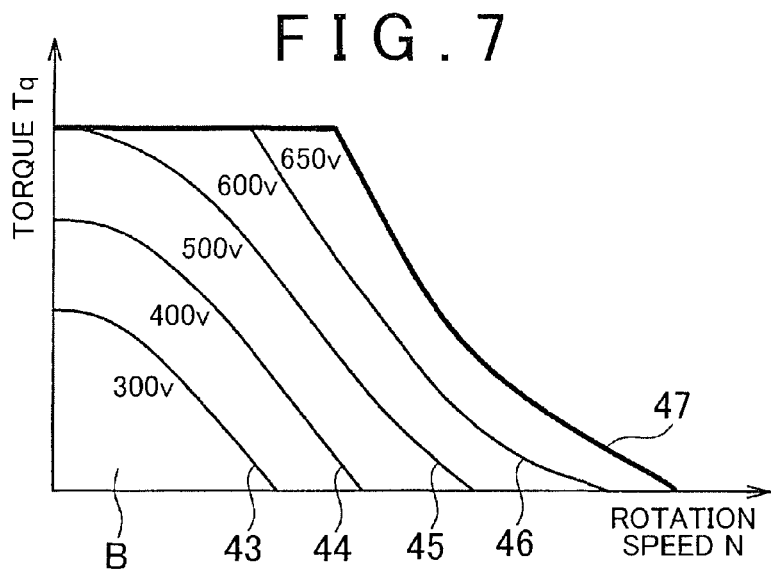
FIG. 7 is a diagram that shows a map referred to by a system voltage command generating unit in FIG. 6.

FIG. 7 shows an example of a map to be referred to when the system voltage command value VH* is obtained. In the map, as well as the map shown in FIG. 4, the abscissa axis represents motor rotation speed N, and the ordinate axis represents torque Tq. A motor operation region in the map is divided by four narrow solid lines 43 to 46 respectively corresponding to 300 V, 400 V, 500 V and 600 V that are typical system voltages VH, and a thick solid outline 47 located at the rightmost side in the graph corresponds to the maximum step-up voltage 650 V. Here, a substantially fan-shaped region B, divided by the line 43 of 300 V, is an operation region in which it is possible to drive the alternating-current motor M1 with the use of the battery voltage Vb as the system voltage VH without stepping up the battery voltage Vb. However, more specifically, step-up lines are defined in steps of a predetermined voltage (for example, 40 V) between the lines 43 to 47, and the system voltage command value VH* is set in steps of the predetermined voltage on the basis of an operation point specified by the torque command value Tq* and the rotation speed N.

Referring back to FIG. 6, the system voltage feedback unit 60 generates the switching control signals S1 and S2 so that the battery voltage Vb is stepped up to the input system voltage command value VH*, and outputs the switching control signals S1 and S2 to the converter 20. The on/off states of the switching elements E1 and E2 are controlled upon receiving the control signals. In this way, the system voltage VH corresponding to the voltage command value VH* is supplied from the converter 20 to the inverter 22 via the smoothing capacitor 18.

The system voltage VH that is a voltage output from the converter 20 is detected by the voltage sensor 14, and is input to the system voltage feedback unit 60. In this way, a closed control loop is formed, and feedback control of the system voltage VH is executed. Specifically, a controlled operation amount (specifically, the duty ratios of the switching elements E1 and E2 of the converter 20) is, for example, subjected to PI operation for feedback control so that a deviation between the system voltage command value VH* and the system voltage VH detected by the voltage sensor 14 is eliminated.

Figure 8:
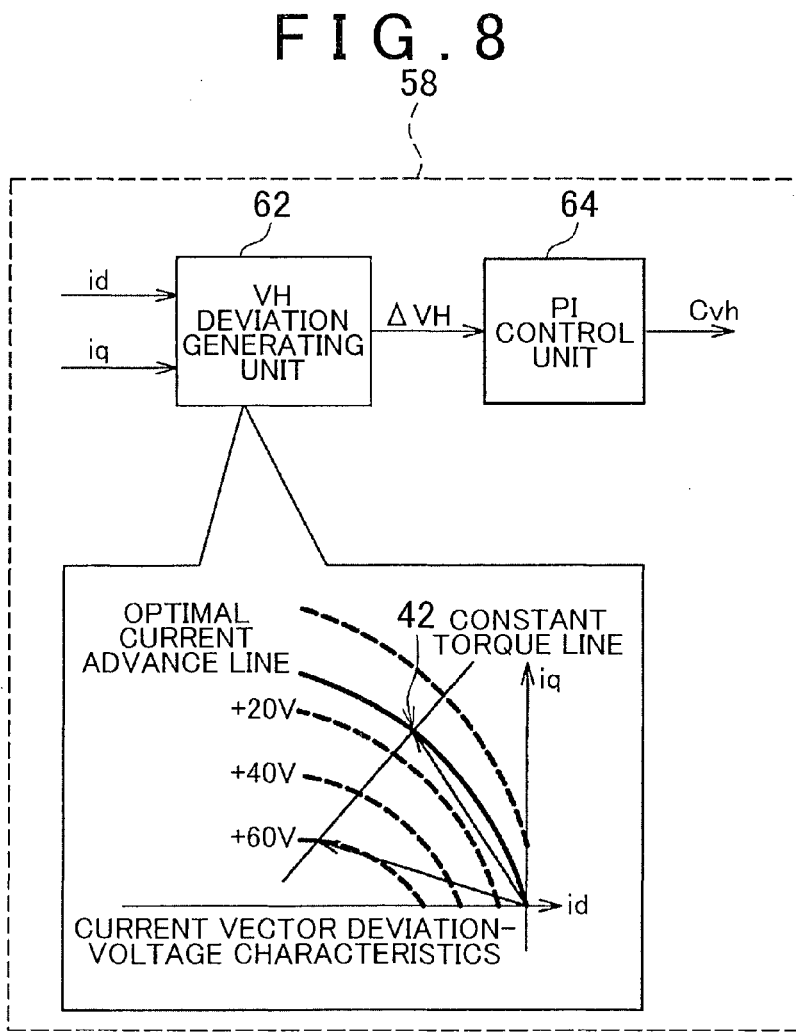
FIG. 8 is a block diagram that shows an example of a current phase feedback unit in FIG. 6.

The current phase feedback unit 58 has the function of receiving a current phase (id, iq) that is an actual motor current generated by the three-phase/two-phase conversion unit 50 and outputting a system voltage correction value Cvh in accordance with the received current phase (id, iq). Specifically, as shown in FIG. 8, the current phase feedback unit 58 includes a VH deviation generating unit 62 and a PI control unit 64.

The VH deviation generating unit 62 generates a system voltage deviation ΔVH required to change the current phase (id, iq) of motor current flowing through the alternating-current motor M1 to the optimal current phase (id, iq)opt without changing torque (that is, along a constant torque line). A map to be referred to for generating a system voltage deviation ΔVH is stored in advance in the control unit 26. FIG. 8 shows an example in which the system voltage deviation ΔVH required to change an actual current phase to the optimal current phase indicated by the reference numeral 42 is +60 volts.

Note that the system voltage deviation ΔVH is set to a negative value (that is, to step down the system voltage VH) when an actual current phase (id, iq) that is on the smaller angle side of the optimal current advance line is changed to the optimal current phase (id, iq)opt.

The PI control unit 64 executes proportional and integral control for eliminating the system voltage deviation ΔVH generated by the VH deviation generating unit 62. Specifically, the PI control unit 64 performs PI operation with the use of the predetermined proportional gain and the predetermined integral gain to obtain the system voltage correction value Cvh. Then, as shown in FIG. 6, the system voltage correction value Cvh is added to the system voltage command value VH*, generated by the system voltage command generating unit 56, in an adding unit 59. In this way, a corrected system voltage command value (VH*+Cvh) is generated. Such correction of the system voltage command value VH* is repeatedly executed in the closed control loop that includes the current phase feedback unit 58. In this way, it is possible to accurately and quickly shift into a state where the alternating-current motor M1 is controlled by rectangular wave control with the current phase (id, iq) being the optimal current phase (id, iq)opt.

Note that it is desirable that the correction value Cvh of the system voltage VH is not changed for a predetermined period of time after the control method for the alternating-current motor M1 is changed. In addition, a configuration may be employed, in which the system voltage VH is not corrected for a predetermined period of time after the converter 20 starts step-up operation. These are effective in preventing hunting of a change among the control modes.

FIG. 9 shows a state where the system voltage VH is corrected as described above on a rotation speed-torque map. For example, as shown in the upper graph of FIG. 9, it is assumed that, in the upper arm on state where the battery voltage Vb is directly supplied to the inverter 22 as the system voltage VH during non-step-up operation of the converter 20, a current operation point X1 of the alternating-current motor M1 in an overmodulation control region A2 significantly exceeds an overmodulation rectangular wave change line 70 and shifts into an operation point X2 in a rectangular wave control region A3. The changed operation point X2 is an operation point at which the alternating-current motor M1 is drivable through rectangular wave control without step-up operation of the converter 20. Note that description will be made on an example in which the pre-change operation point X1 is an operation point within the overmodulation control region A2; however, the same applies to the case where the operation point X1 is in a sinusoidal PWM region A1.

In such a case, in the motor control system 10 according to the present embodiment, step-up operation of the converter 20 is started and, in this way, the system voltage VH is corrected as described above to a higher value, and, as shown in the lower graph of FIG. 9, the overmodulation rectangular wave change line 70 is shifted toward a higher rotation speed side (that is, rightward in the graph). In this way, the operation point X2 is located near the overmodulation rectangular wave change line 70 in the rectangular wave control region A3.

In contrast to this, when the converter 20 is in step-up operation and the operation point of the alternating-current motor M1 shifts from the rectangular wave control region A3 to the overmodulation region A2 or the sinusoidal PWM region A1 beyond the overmodulation rectangular wave change line 70, the system voltage VH is set so as to be low by correcting the system voltage. VH as described above. That is, a voltage stepped-up by the converter 20 decreases. In this way, the overmodulation rectangular wave change line 70 shifts toward a low rotation speed side (that is, leftward in the graph), and the operation point is also located near the overmodulation rectangular wave change line 70 in the rectangular wave control region A3. Note that, in this case; when the corrected system voltage command value (VH*+Cvh) is lower than the battery voltage Vb, the converter 20 stops step-up operation, and overmodulation control or sinusoidal PWM control, which uses the battery voltage Vb as the system voltage VH, is executed.

By executing variable control of the system voltage VH through control by feedback of the current phase of motor current as described above, it is possible to drive the alternating-current motor M1 with the optimal current phase (id, iq)opt in rectangular wave control while suppressing a voltage stepped-up by the converter 20 to the extent possible. In this way, it is possible to effectively reduce or minimize a loss of the whole system that includes the converter 20, the inverter 22 and the alternating-current motor M1.

In the motor control system 10 that includes the above-described converter 20, when rectangular wave control is executed with the optimal current phase (id, ip)opt by directly using the battery voltage Vb as the system voltage VH without stepping up the battery voltage Vb, the step-up operation of the converter 20 needs to be started at a certain point in time with an increase in output torque request, that is, a torque command value Tq*, for the alternating-current motor M1; however, because the modulation factor Kmd is constant as described above, it is not possible to determine whether to start the step-up operation on the basis of the modulation factor Kmd.

In this case, it is conceivable that the step-up operation of the converter 20 is started immediately after shifting into rectangular wave control. In such a case, in order to reliably prevent the upper-atm switching element E1 and lower-arm switching element E2 of the converter 20 from turning on at the same time, that is, short-circuiting, it is desirable to provide a time period during which both the switching elements E1 and E2 are turned off at the same time. For this purpose, the system voltage VH after the start of the step-up operation needs to be increased by at least a minimum step-up voltage VHboost_min (for example, 40 V) having a predetermined value.

Thus, at the time of the start of the step-up operation of the converter 20, an operating point at which rectangular wave control is executed with the optimal current phase (id, ip)opt by using the battery voltage Vb shifts into an operating point in overmodulation control mode or sinusoidal PWM control mode in which a system loss is relatively large due to the above-described increase in the system voltage VH by the minimum step-up voltage VHboost_min. As a result, until a torque command Tq* for the alternating-current motor M1 increases and rectangular wave control is executed again after the start of step-up operation of the converter 20, the system is operated in a state where a system loss is large.

To suppress such an increase in system loss between before and after starting the step-up operation, it is required to start the step-up operation of the converter at an appropriate timing during rectangular wave control in a state where a motor current is at the optimal current phase (id, ip)opt as described above. Then, in the motor control system 10 according to the present embodiment, it is determined whether to start the step-up operation on the basis of a current phase of a current vector or a current value. By so doing, an increase in system loss is suppressed. Next, the step-up start control will be described with reference to FIG. 10 and FIG. 11.

Figure 10:
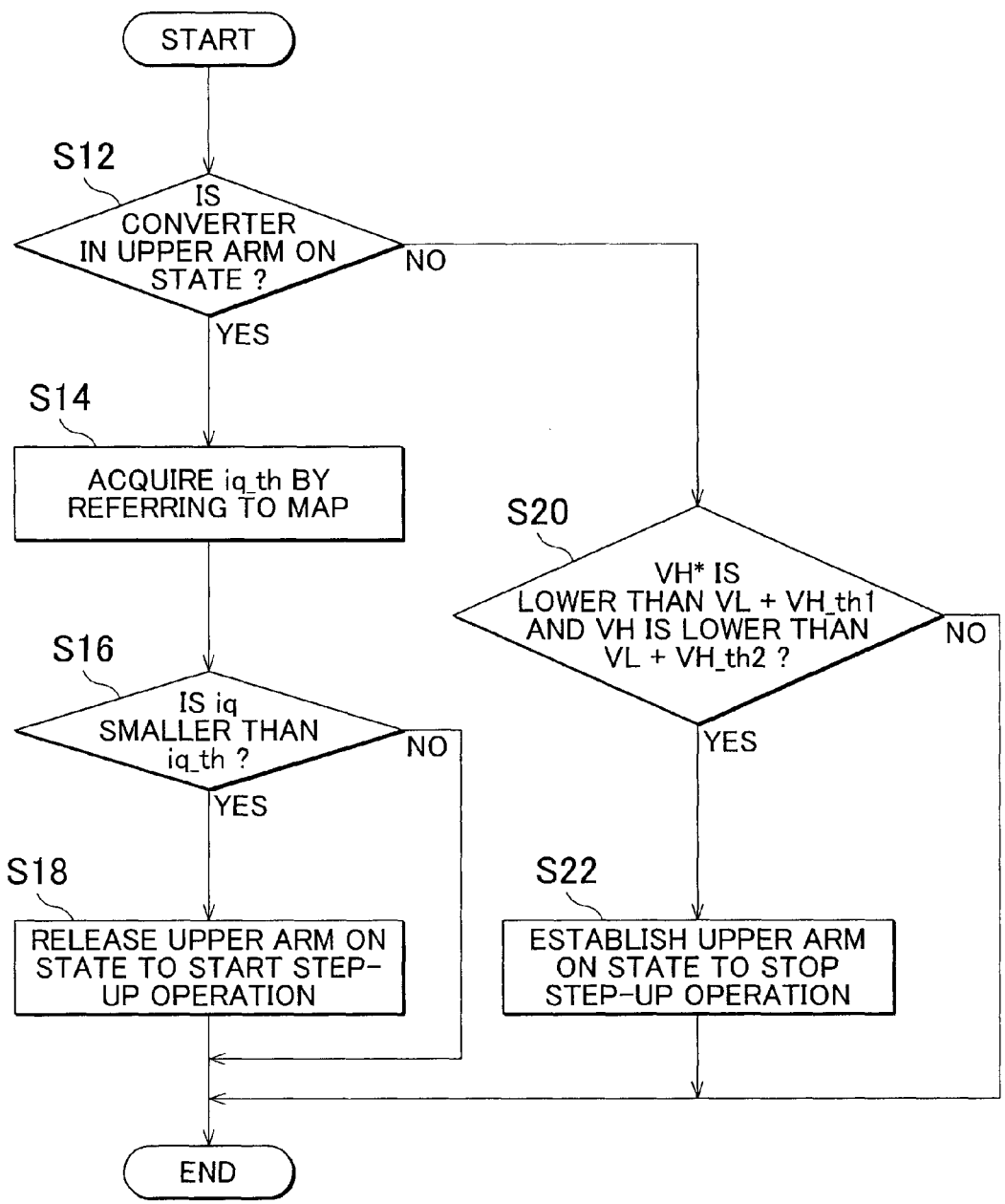
FIG. 10 is a flowchart that shows the procedure of starting or stopping the step-up operation of a converter on the basis of a current vector of motor current.
Figure 11:
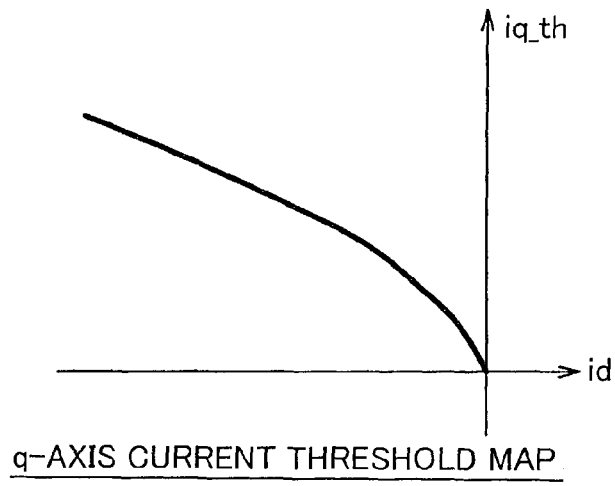
FIG. 11 is a diagram that shows a q-axis current threshold map referred to in step S14 in FIG. 10.

FIG. 10 is a flowchart that shows the procedure of step-up start control executed by the control unit 26. FIG. 11 is a diagram that shows a q-axis current threshold map referred to in the step-up start control. The step-up start control is repeatedly executed at predetermined time intervals in the control unit 26 when rectangular wave control is executed for the alternating-current motor M1 with the optimal current phase (id, ip)opt.

As shown in FIG. 10, the control unit 26 initially determines whether the converter 20 is in an upper arm on state (step S12).

Then, when it is determined that the converter 20 is in the upper arm on state (YES in step S12), the control unit 26 subsequently refers to the map as shown in FIG. 11 to acquire a q-axis current threshold iq_th (step S14). The map is stored in advance in a read only memory (ROM), or the like, as a result of an experiment, simulation, or the like. In addition, by referring to the map, it is possible to derive a q-axis current threshold iq_th with the use of a d-axis current id output from the three-phase/two-phase conversion unit 50 (see FIG. 6).

Here, the q-axis current threshold iq_th is a value at which the current phase of the current vector of motor current on a d-q coordinate plane becomes a current phase corresponding to motor torque, at which a system loss is equal between before and after starting the step-up operation. Thus, if the step-up operation of the converter 20 is started when the q-axis current iq of motor current flowing through the alternating-current motor M1 has reached the q-axis current threshold iq_th, a system loss is equal between before and after the system voltage VH is stepped up from the battery voltage Vb by the minimum step-up voltage VHboost_min. As a result, it is possible to suppress an increase in system loss at the time of a start of the step-up operation.

The control unit 26 compares the q-axis current iq with the q-axis current threshold iq_th in subsequent step S16. Then, when the q-axis current iq is smaller than the q-axis current threshold iq_th (YES in step S16), the control unit 26 causes the converter 20 to release the upper arm on state and start the step-up operation (step S18).

On the other hand, when it is determined in step S12 that the converter 20 is not in the upper arm on state, that is, when the converter 20 is carrying out step-up operation (NO in step S12), the control unit 26 determines whether step-up stop conditions are satisfied (step S20).

Specifically, the control unit 26 determines, as the step-up stop conditions, whether a system voltage command value VH* is lower than a first step-up stop threshold and whether a current system voltage VH detected by the voltage sensor 14 is lower than a second step-up stop threshold.

Here, the first step-up stop threshold may be a value obtained by adding a first determination threshold VH_th1 to the converter input voltage VL. The first determination threshold VH_th1 is set in order to determine whether the system voltage command value VH* is decreased to a level such that rectangular wave control is executable at the above-described optimal current phase (id, ip)opt when the battery voltage Vb is supplied to the inverter 22 as the system voltage VH without stepping up the battery voltage Vb. The first determination threshold VH_th1 is desirably set so as to be lower than the above-described minimum step-up voltage VHboost_min. By so doing, it is possible to suppress a hunting phenomenon in which start and stop of the step-up operation of the converter 20 frequently occur. In addition, as the above-described first determination threshold VH_th1, a value obtained through an experiment, simulation, or the like may be stored in advance. Note that, instead of the converter input voltage VL included in the first step-up stop threshold, the battery voltage Vb detected by the voltage sensor 12 may be used.

In addition, in step S20, whether the current system voltage VH is lower than, the second step-up stop threshold is one of the step-up stop conditions. This is to avoid the following situation. When an actual system voltage VH detected by the voltage sensor 14 is excessively high, an overvoltage is applied to the battery 11 via the converter 20 when the step-up operation is stopped and the upper arm on state is established, causing degradation of the battery 11. In terms of this point, a second determination threshold VH_th2 included in the second step-up stop threshold may be set and stored in the ROM, or the like, in advance. However, the second determination threshold VH_th2 does not need to be constant and may be changed on the basis of a state of the battery 11 (for example, a battery voltage Vb, a battery temperature Tb, and the like). In addition, in order to obtain affirmative determination in step S20, the second determination threshold VH_th2 is set so as to be higher than the first determination threshold VH_th1 (that is, VH_th2>VH_th1).

When it is determined in step S20 that the step-up stop conditions are satisfied, the control unit 26 brings the converter 20 into the upper arm on state to stop the step-up operation in subsequent step S22. On the other hand, when it is determined in step S20 that the step-up stop conditions are not satisfied, the process ends. That is, the step-up operation of the converter 20 is continued.

Figure 12:
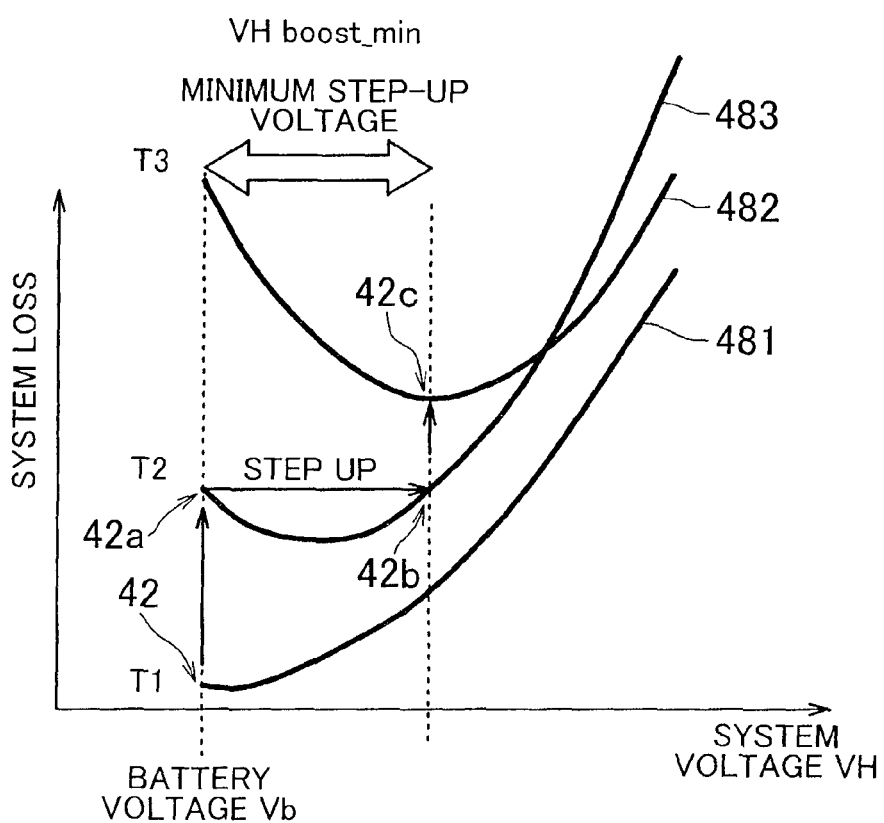
FIG. 12 is a graph that schematically shows a correlation between a system voltage and a system loss in the case where step-up start control is executed.
Figure 13:
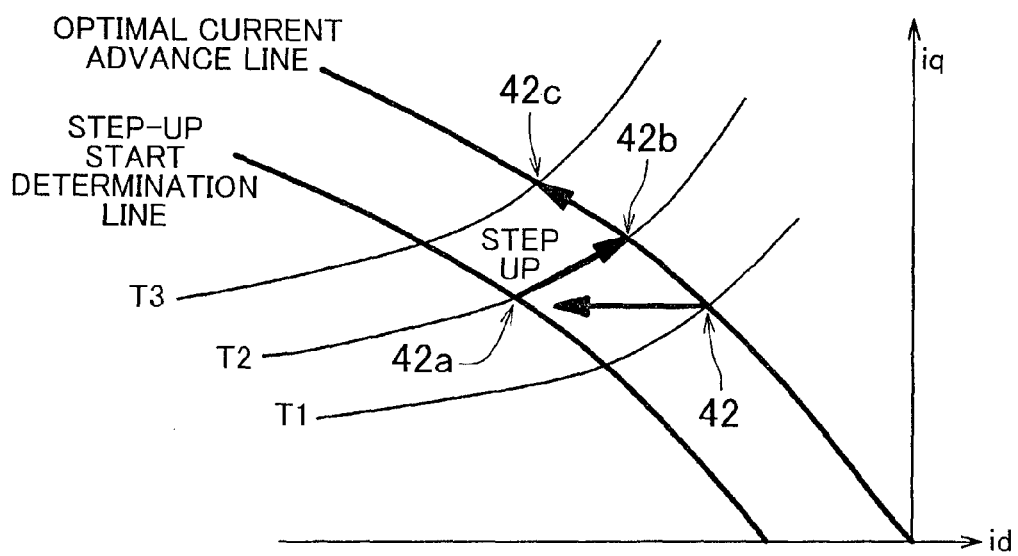
FIG. 13 is a graph that shows a state where a current vector of motor current varies at the time of a start of step-up operation.

FIG. 12 is a graph that schematically shows the correlation between a system voltage VH and a system loss in the case where the above-described step-up start control is executed. FIG. 13 is a graph that shows a state where a current vector of motor current varies at the time of a start of the step-up operation.

In FIG. 12, three loss curves 481, 482 and 483 respectively corresponding to output torques T1, T2 and T3 of the alternating-current motor M1 are shown. Here, T1<T2<T3.

As shown in FIG. 12 and FIG. 13, a loss of the system as a whole is minimum when an operating point 42 at which rectangular wave control is executed for the alternating-current motor M1 with the optimal current phase (id, iq)opt directly using the battery voltage Vb as the system voltage VH is on the loss curve 481 as described above.

As the torque command value Tq* increases, the current phase of the current vector is adjusted from the operating point 42 toward a larger phase side (that is, the d-axis current id increases toward a negative side) and the current vector of motor current therefore deviates leftward from the optimal current advance line in FIG. 13, which results in an increase in a system loss.

As shown in FIG. 13, a step-up start determination line is defined on a larger phase side of the optimal current advance line substantially in parallel with the optimal current advance line. The step-up start determination line is drawn by plotting the q-axis current threshold iq_th used in step S16 of the above-described step-up start control for each corresponding d-axis current id and then connecting the plots.

As the operating point of the alternating-current motor M1 shifts from the operating point 42 and reaches an operating point 42a indicated on the step-up determination start line, the step-up operation of the converter 20 is started, and the system voltage VH increases by the minimum step-up voltage VHboost_min. By so doing, the current phase of the current vector shifts to an operating point 42b on the optimal current advance line while keeping the torque T2 equal to that of the operating point 42a.

When this is considered in FIG. 12, at the time of shifting from the operating point 42 corresponding to the torque T1 to the operating point 42a corresponding to the torque T2 while the system voltage V11 remains at the battery voltage Vb, the step-up operation of the converter 20 is started, and the system voltage VH increases by the minimum step-up voltage VHboost_min. At this time, the operating point shifts to the operating point 42b at which a system loss is equal on the same loss curve 482, so the system loss does not increase between before and after starting the step-up operation.

After that, when the torque command value Tq* for the alternating-current motor M1 increases further from T2 to T3 and the operating point of the motor M1 shifts from the point 42b to a point 42c, control for minimizing a system loss while maintaining rectangular wave control with the optimal current phase (id, iq)opt is continued.

As described above, with the motor control system 10 according to the present embodiment, it is possible to suppress an increase in system loss by starting the step-up operation of the converter 20 at an appropriate timing while rectangular wave control is performed.

Next, a motor control system 80 that is another embodiment will be described with reference to FIG. 14 and FIG. 15. Here, the difference from the motor control system 10 will be mainly described, like reference numerals denote the same component elements, and redundant description is omitted.

Figure 14:
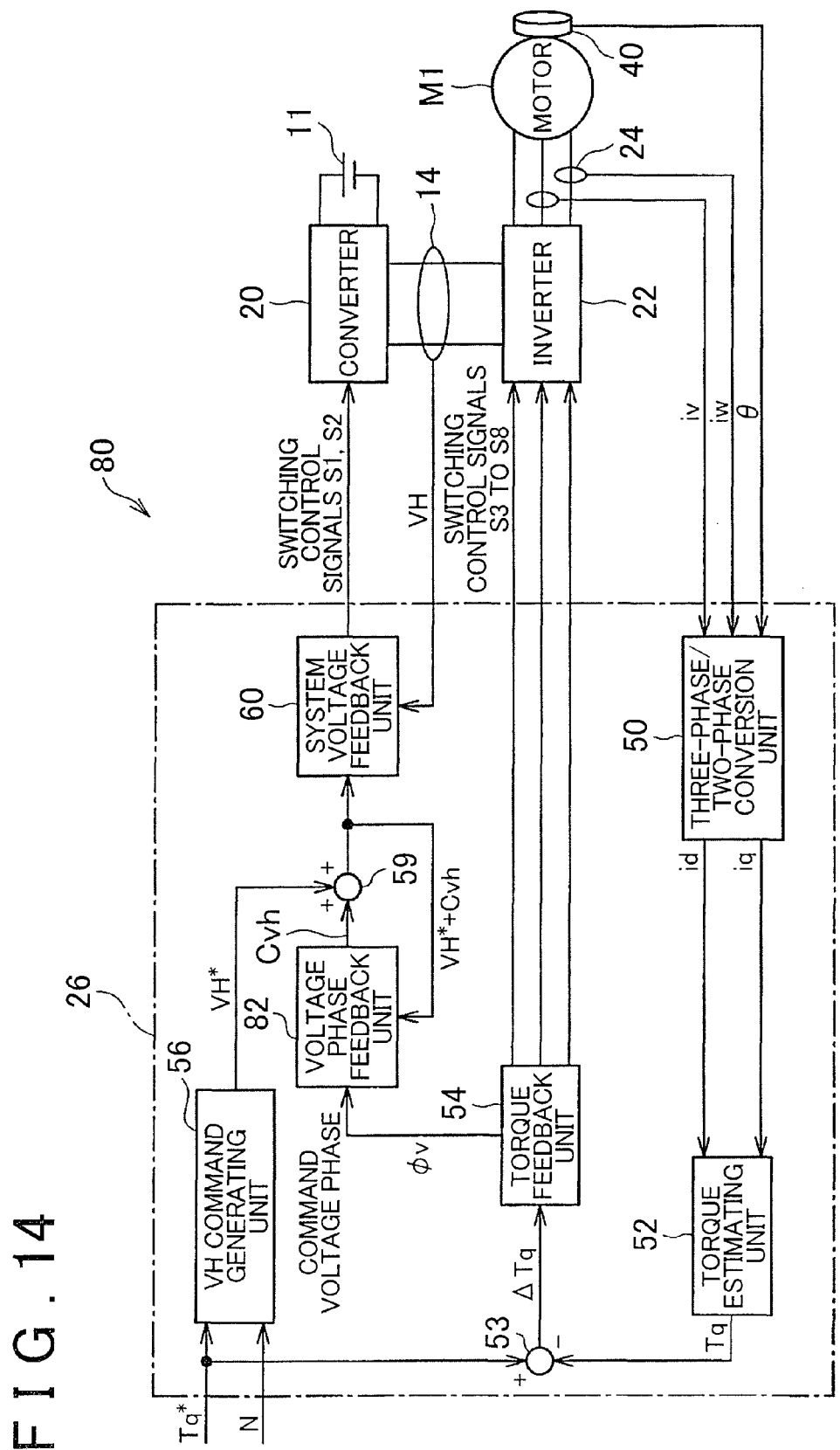
FIG. 14 is a block diagram that shows a control unit that includes a voltage phase feedback unit instead of a current phase feedback unit and that is similar to FIG. 6.

FIG. 14 is a block diagram that shows a control unit 26 that includes a voltage phase feedback unit 82 instead of the current phase feedback unit 58, and is similar to FIG. 6. FIG. 15 is a block diagram that shows an example of the voltage phase feedback unit 82 in FIG. 12. In the motor control system 80 according to the present embodiment, the control unit 26 includes the voltage phase feedback unit 82 instead of the current phase feedback unit 58 that executes control by feedback of the current phase of a current vector. The other configuration is the same as that of the motor control system 10.

As shown in FIG. 14, the voltage phase feedback unit 82 has the function of receiving a command voltage phase $\Phi v$ input from the torque feedback unit 54 of a rectangular wave control block, generating a system voltage correction value Cvh on the basis of the command voltage phase $\Phi$ and outputting the system voltage correction value Cvh to the adding unit 59. A system voltage command value VH* (accurately, "VH*+Cvh") corrected by addition of the system voltage correction value Cvh (described later) is input to the voltage phase feedback unit 82.

Figure 15:
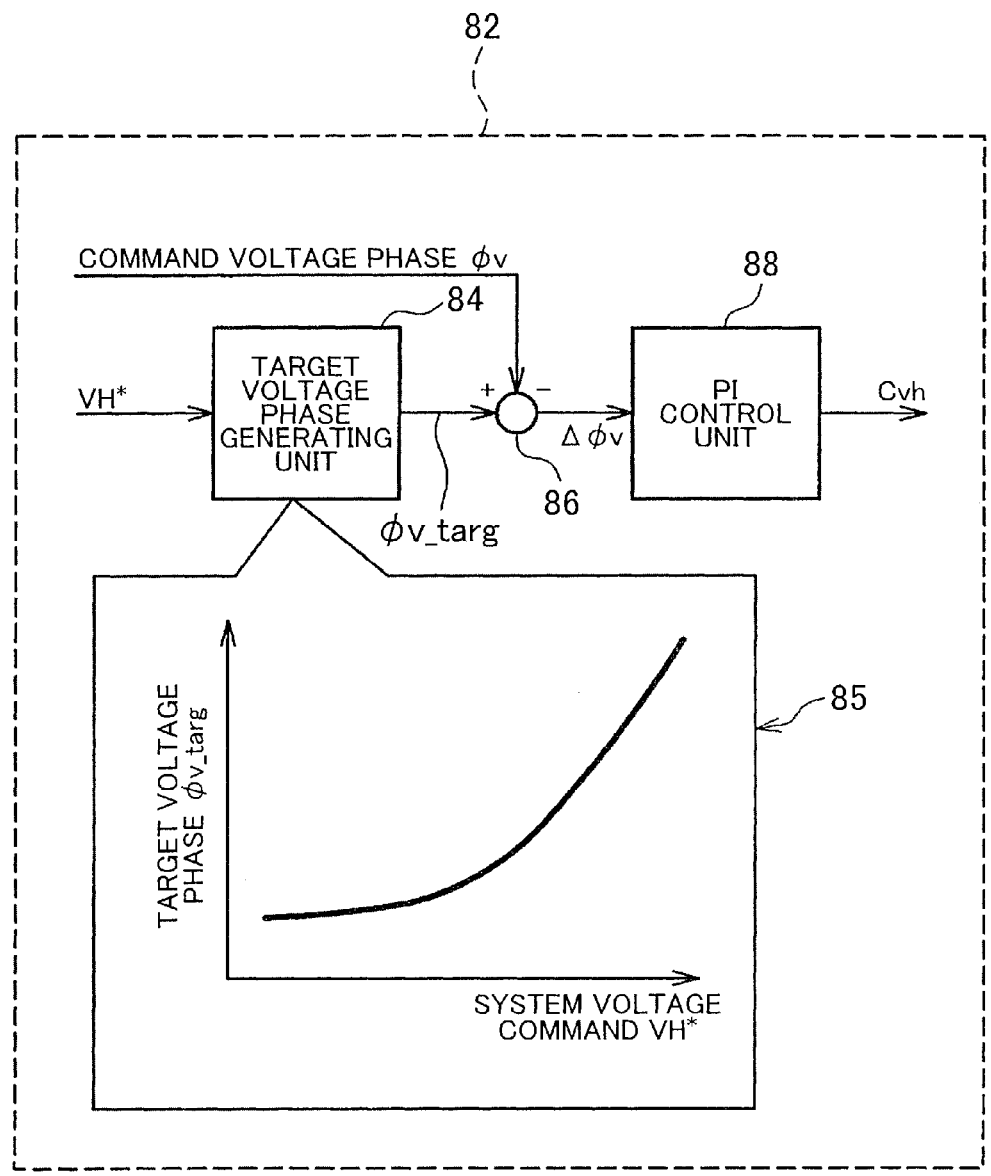
FIG. 15 is a block diagram that shows an example of the voltage phase feedback unit in FIG. 14.

More specifically, as shown in FIG. 15, the voltage phase feedback unit 82 includes a target voltage phase generating unit 84, a subtracting unit 86 and a PI control unit 88.

In the target voltage phase generating unit 84, a map 85 that defines the correlation between a corrected system voltage command value VH* and a target voltage phase $\Phi v\_targ$ is stored in advance in a. ROM, or the like, and a target voltage phase $\Phi v\_targ$ is derived from the map 85 on the basis of the input system voltage command value VH*. Here, the "target voltage phase $\Phi v\_targ$" is a voltage phase of rectangular-wave pulse required to change the current phase (id, iq) of motor current flowing through the alternating-current motor M1 to the above optimal current phase (id, iq)opt without changing torque (that is, along a constant torque line).

The target voltage phase $\Phi v\_targ$ output from the target voltage phase generating unit 84 is compared with or subtracted from the command voltage phase $\Phi v$ in the subtracting unit 86. In this way, a voltage phase deviation $\Delta \Phi v$ is generated. Then, the voltage phase deviation $\Delta \Phi v$ is input to the PI control unit 88.

The PI control unit 88 executes proportional and integral control for eliminating the above voltage phase deviation $\Delta \Phi v$. Specifically, the PI control unit 88 performs PI operation with the use of a predetermined proportional gain and a predetermined integral gain to obtain a control deviation, specifically, a system voltage correction value Cvh, and then adds the system voltage correction value Cvh to the system voltage command value VH* generated by the system voltage command generating unit 56 in the adding unit 59, thereby generating a corrected system voltage command value (VH*+Cvh).

Such correction of the system voltage command value VH* is repeatedly executed in the closed control loop that includes the voltage phase feedback unit 82. In this way, it is possible to accurately and quickly shift into a state where the alternating-current motor M1 is controlled by rectangular wave control with the current phase (id, iq) being the optimal current phase (id, iq)opt.

Figure 16:
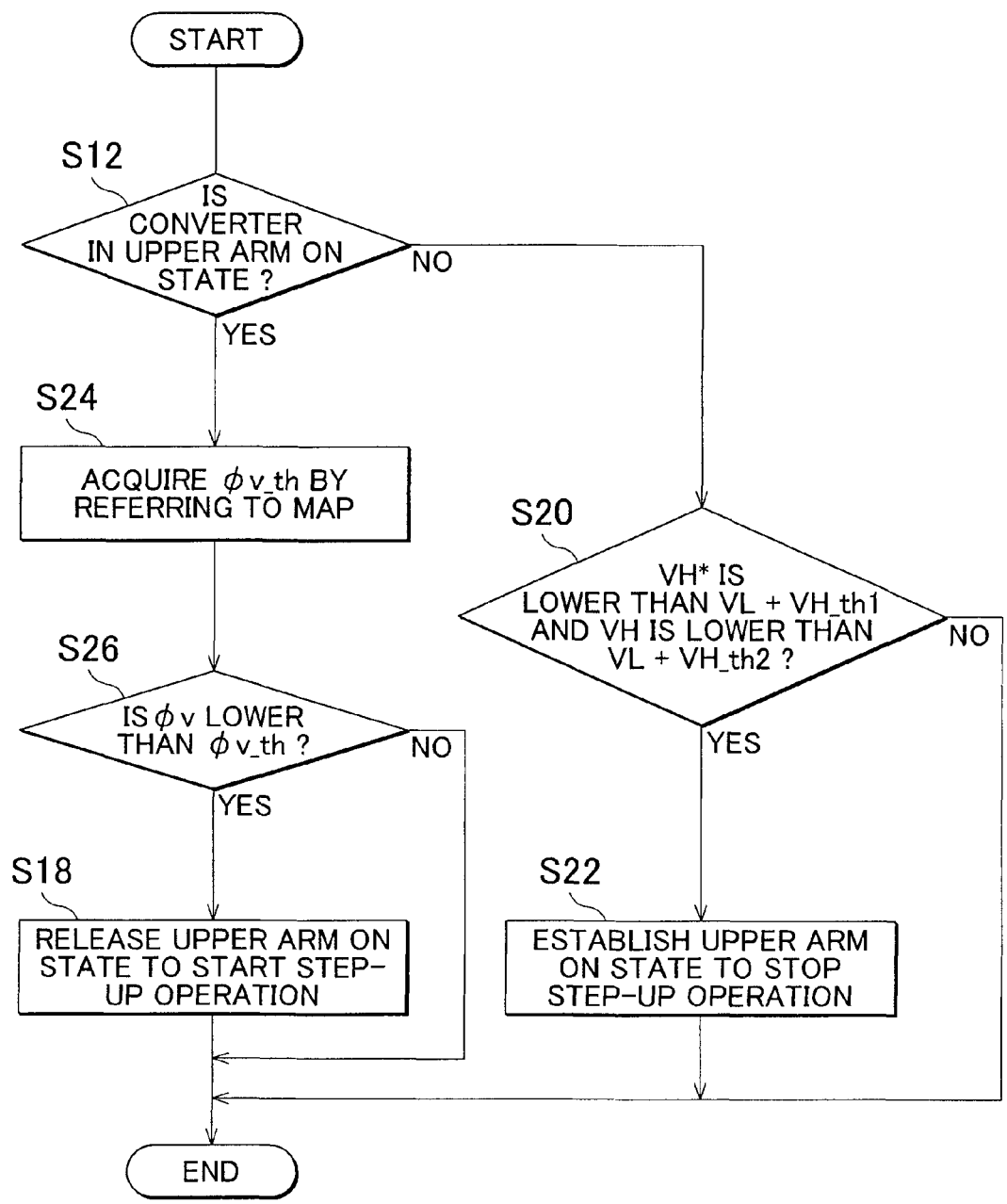
FIG. 16 is a flowchart that shows the procedure of starting or stopping the step-up operation of the converter on the basis of a phase of a rectangular-wave voltage.
Figure 17:
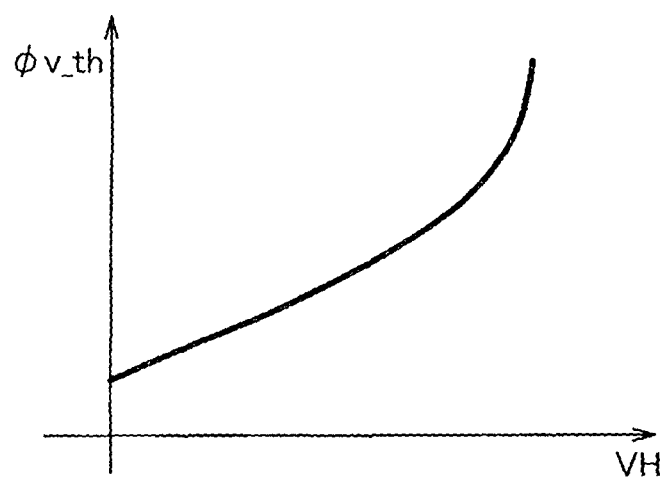
FIG. 17 is a diagram that shows a voltage phase threshold map referred to in step S24 in FIG. 16.

The motor control system 80 according to the present embodiment also makes it possible to operate the alternating-current motor M1 with the optimal current phase (id, iq)opt in rectangular wave control while suppressing a voltage stepped-up by the converter 20 to the extent possible, by executing control by feedback of voltage phase of a rectangular-wave pulse. Thus, it is possible to effectively reduce or minimize a loss of the system that includes the converter 20; and the alternating-current motor M1. However, in the present embodiment as well, in order to execute stable feedback control and smooth variable control of the system voltage, the process for selecting a system voltage deviation to be subjected to feedback control is executed as follows Next, the step-up start control in the motor control system 80 according to the present embodiment will be described with reference to FIG. 16 and FIG. 17. FIG. 16 is a flowchart that shows the procedure of starting or stopping the step-up operation of the converter 20 on the basis of a phase of a rectangular-wave voltage. FIG. 17 is a diagram that shows a voltage phase threshold map referred to in step S24 in FIG. 16.

As shown in FIG. 16, step-up start control executed by the control unit 26 in the present embodiment is substantially similar to that of the motor control system 10 according to the above embodiment, and the current phase of a current vector of motor current is just replaced with the phase of a rectangular-wave voltage applied to the alternating-current motor M1. Of the steps shown in FIG. 16, only steps S24 and S26 different from those of FIG. 10 will be described.

As shown in FIG. 16, when it is determined in step S12 that the converter 20 is in the upper arm on state, subsequently, a voltage phase threshold $\Phi v\_th$ is acquired by referring to the map as shown in FIG. 17 (step S24). The map is stored in advance in a ROM, or the like, as a result of an experiment, simulation, or the like. In addition, by referring to the map, it is possible to derive a voltage phase threshold $\Phi v\_th$ with the use of a system voltage VH detected by the voltage sensor 14 (or a system voltage command value VH* output from the VH command generating unit 56).

Here, the voltage phase threshold $\Phi v\_th$ is a value at which the current vector of motor current on a d-q coordinate plane corresponds to a voltage phase corresponding to motor torque at which a system loss is equal between before and after starting step-up operation. Thus, if the step-up operation of the converter 20 is started when the voltage phase of a rectangular-wave voltage applied to the alternating-current motor M1 has reached the above-described voltage phase threshold $\Phi v\_th$, a system loss is equal between before and after the system voltage VH is stepped up from the battery voltage Vb by the minimum step-up voltage VHboost_min. As a result, it is possible to suppress an increase in system loss at the time of a start of the step-up operation.

The control unit 26 compares the command voltage phase $\Phi v$, acquired from the torque feedback unit 54, with the voltage phase threshold $\Phi v\_th$ in subsequent step S26. Then, when the command voltage phase $\Phi v$ becomes smaller than the voltage phase threshold $\Phi v\_thq$ (YES in step S26), the control unit 26 causes the converter 20 to release the upper arm on state and start the step-up operation (step S18).

In this way, with the motor control system 80 according to the present embodiment as well, it is possible to suppress an increase in system loss by starting the step-up operation of the converter 20 at an appropriate timing while rectangular wave control is performed.

Note that the motor control system according to the invention is not limited to the above described configurations of the embodiments and alternative embodiments, and various modifications and improvements can be made within the matter described in the scope of the appended claims.

The invention claimed is:

1. A motor control system comprising:
a converter that is configured to be able to step up a direct-current voltage, supplied from a power supply, in accordance with a system voltage command value;
an inverter that is configured to convert the direct-current voltage, which is a system voltage output from the converter, to an alternating-current voltage;
a motor that is driven by the alternating-current voltage applied from the inverter; and
a control unit that is configured to drive the motor in any one of control methods of sinusoidal PWM control, overmodulation control and rectangular wave control by executing operation control of the converter and the inverter, wherein
the control unit is configured to start step-up operation of the converter when a current vector of motor current of the motor on a d-q coordinate plane becomes the current phase corresponding to motor torque, at which a system loss is equal between before and after starting the step-up operation, while the control unit supplies the direct-current voltage, supplied from the power supply, to the inverter without stepping up the direct-current voltage by the converter and performs the rectangular wave control of the motor in a state where the current phase is an optimal current phase.

2. The motor control system according to claim 1, wherein the control unit is configured to start the step-up operation of the converter when the current vector of the motor current becomes the current phase corresponding to motor torque, at which a system loss is equal between before and after starting the step-up operation, provided that the direct-current voltage of the power supply is stepped up by a predetermined voltage value when the step-up operation of the converter is started.

3. The motor control system according to claim 2, wherein the control unit stores a step-up start threshold line on a larger phase side of an optimal current advance line on the d-q coordinate plane in a form of a map, and is configured to start the step-up operation of the converter when the current phase of the current vector goes beyond the step-up start threshold line to the larger phase side.

4. The motor control system according to claim 3, wherein the control unit is configured to start the step-up operation of the converter when a q-axis current that determines the current vector is smaller than a q-axis current threshold on the step-up start threshold line.

5. The motor control system according to claim 1, wherein the control unit is configured to stop the step-up operation of the converter and supply the direct-current voltage of the power supply directly to the inverter when the system voltage command value becomes lower than a first step-up stop threshold and the system voltage detected by a sensor becomes lower than a second step-up stop threshold while the step-up operation of the converter is performed.

6. A motor control system comprising:
a converter that is configured to be able to step up a direct-current voltage, supplied from a power supply, in accordance with a system voltage command value;
an inverter that is configured to convert the direct-current voltage, which is a system voltage output from the converter, to an alternating-current voltage;
a motor that is driven by the alternating-current voltage applied from the inverter; and
a control unit that is configured to drive the motor in any one of control methods of sinusoidal PWM control, overmodulation control and rectangular wave control by executing operation control of the converter and the inverter, wherein
the control unit is configured to start step-up operation of the converter when a voltage phase of a rectangular-wave voltage applied to the motor becomes a voltage phase corresponding to motor torque, at which a system loss is equal between before and after starting the step-up operation, while the control unit supplies the direct-current voltage, supplied from the power supply, to the inverter without stepping up the direct-current voltage by the converter and performs the rectangular wave control of the motor in a state where the current phase of a current vector of motor current of the motor on a d-q coordinate plane is an optimal current phase.

7. The motor control system according to claim 6, wherein the control unit is configured to start the step-up operation of the converter when the voltage phase of the rectangular-wave voltage becomes a voltage phase corresponding to motor torque, at which a system loss is equal between before and after starting the step-up operation, provided that the direct-current voltage of the power supply is stepped up by a predetermined voltage value when the step-up operation of the converter is started.

8. The motor control system according to claim 7, wherein the control unit stores a map that defines a correlation between the system voltage and a voltage phase threshold, and is configured to start the step-up operation of the converter when the voltage phase of the rectangular-wave voltage exceeds a step-up start threshold derived from the map.

9. The motor control system according to claim 6, wherein the control unit is configured to stop the step-up operation of the converter and directly supply the direct-current voltage of the power supply to the inverter when the system voltage command value becomes lower than a first step-up stop threshold and the system voltage detected by a sensor becomes lower than a second step-up stop threshold while the step-up operation of the converter is performed.

* * * * *